United States Patent
Helfgott et al.

(10) Patent No.: US 11,908,073 B2
(45) Date of Patent: Feb. 20, 2024

(54) METHODS AND SYSTEMS FOR DYNAMICALLY RENDERING THREE-DIMENSIONAL MODELS IN REAL-TIME TO GENERATE A NON-FUNGIBLE TOKEN AND A PHYSICAL MODEL THEREOF WITHOUT PROVISIONING OR MANAGING SERVERS

(71) Applicant: Valence Digital Inc., New York, NY (US)

(72) Inventors: Adam Helfgott, New York, FL (US); Matthew Barlin, Pownal, VT (US)

( * ) Notice: Subject to any disclaimer, the term of this patent is extended or adjusted under 35 U.S.C. 154(b) by 0 days.

(21) Appl. No.: 18/139,788

(22) Filed: Apr. 26, 2023

(65) Prior Publication Data

US 2023/0351680 A1 Nov. 2, 2023

Related U.S. Application Data

(60) Provisional application No. 63/335,575, filed on Apr. 27, 2022.

(51) Int. Cl.
| | |
|---|---|
| *G06T 17/00* | (2006.01) |
| *G06T 19/20* | (2011.01) |
| *G06T 15/04* | (2011.01) |
| *H04L 9/00* | (2022.01) |
| *B33Y 10/00* | (2015.01) |

(52) U.S. Cl.
CPC .............. *G06T 17/00* (2013.01); *B33Y 10/00* (2014.12); *G06T 15/04* (2013.01); *G06T 19/20* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 5,894,308 A * | 4/1999 | Isaacs | G06T 17/20 |
| | | | 345/420 |
| 10,217,185 B1 * | 2/2019 | Cabanero | H04L 67/01 |

(Continued)

OTHER PUBLICATIONS

David P. Leubke, "A Developer's Survey of Polygonal Simplification Algorithms", Jun. 2001, IEEE, IEEE Computer Graphics and Applications, vol. 21, Issue: 3, pp. 24-35.*

*Primary Examiner* — Robert Bader
(74) *Attorney, Agent, or Firm* — Derek Fahey, Esq.; The Plus IP Firm, PLLC

(57) ABSTRACT

A system and method for creating a physical three-dimensional model based on a plurality of digital assets is disclosed. The system comprises a first computing device, a second computing device, and a third computing device. The first computing device is configured for sending, over a communications network to a second computing device that is provisioned and managed by a third party, a compressed top-down model, and a compressed three-dimensional base model to be stored on the second computing device. The third computing device is configured for a user to interact with a user interface provided by the second computing device to combine digital assets and wherein the system simultaneously generates a three-dimensional rendering of the composite of the digital assets. The system then creates a new digital asset stored on a blockchain network and generates physical model thereof based on the composite three-dimensional rendering.

19 Claims, 14 Drawing Sheets

(56) References Cited

U.S. PATENT DOCUMENTS

| | | | |
|---|---|---|---|
| 2008/0052242 A1* | 2/2008 | Merritt | G06F 21/10 |
| | | | 705/51 |
| 2019/0208177 A1* | 7/2019 | Koyama | G06T 7/593 |
| 2020/0066042 A1* | 2/2020 | Marsh | H04N 13/344 |
| 2021/0201336 A1* | 7/2021 | Mallett | G06F 3/011 |
| 2021/0258155 A1 | 8/2021 | Andon et al. | |
| 2021/0359996 A1* | 11/2021 | Brown | G06T 7/73 |
| 2022/0067984 A1* | 3/2022 | Choi | G07F 17/3295 |
| 2022/0075845 A1 | 3/2022 | Bowen et al. | |
| 2022/0233959 A1* | 7/2022 | Tsuda | A63F 13/69 |
| 2022/0237846 A1* | 7/2022 | Davidson | B29C 64/393 |
| 2022/0300966 A1* | 9/2022 | Andon | G06Q 30/0277 |
| 2022/0305378 A1* | 9/2022 | Ward | A63F 13/235 |
| 2022/0351279 A1* | 11/2022 | Cardenas Gasca | |
| | | | G06Q 30/0643 |
| 2023/0005230 A1* | 1/2023 | Fersund | G06T 19/20 |

\* cited by examiner

METHODS AND SYSTEMS FOR DYNAMICALLY RENDERING THREE-DIMENSIONAL MODELS IN REAL-TIME TO GENERATE A NON-FUNGIBLE TOKEN AND A PHYSICAL MODEL THEREOF WITHOUT PROVISIONING OR MANAGING SERVERS

CROSS-REFERENCE TO RELATED APPLICATIONS

This application is a non-provisional patent application which claims the priority benefit of U.S. Provisional Application No. 63/335,575 titled "METHODS AND SYSTEMS FOR DYNAMICALLY RENDERING THREE-DIMENSIONAL MODELS IN REAL-TIME TO GENERATE A NON-FUNGIBLE TOKEN AND A PHYSICAL MODEL THEREOF WITHOUT PROVISIONING OR MANAGING SERVERS", and filed Apr. 27, 2022, the subject matter of which is hereby incorporated by reference in its entirety.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present disclosure relates to the field of graphics rendering, and more specifically to the field of graphics rendering to generate physical models based on digital assets or non-fungible tokens.

BACKGROUND

A serverless cloud system, such as Amazon Web Services (herein after AWS), includes a cloud provider that assigns machine processing on demand. The cloud provider charges its users by data via a subscription. Users of the cloud provider must pay monthly fees, computing fees, and storage fees. Because this can be costly for users, users must search for ways to reduce file sizes and use less data to minimize costs.

Current methods of generating three dimensional ("3D") models use large files to hold the large amount of data required for the models. Developers must configure a variety of edges, vertices, and polygons to 3D models. Complex 3D models utilize a high polygon count to portray every detail in high quality, which causes the files to be very large. The prior art fails to use smaller file sizes and to provide real time dynamic rendering in order to reduce costs.

Additionally, common non-fungible tokens (hereinafter "NFT") projects that allow users to create NFTs use predetermined combinations of features to generate preset configurations. NFT projects normally do not provide users with the ability to create their own combination of features rather than generate, or mint, an NFT based on predefined code. Therefore, having to provide predefined NFT's causes more metadata to be stored on a server. Using serverless cloud systems for high poly 3D models and preset configurations of features greatly increases operating costs. Furthermore, developers tend to use larger 3D models to reduce rending speeds, which means even more data to be stored.

The prior art allows users to combine multiple digital assets to produce a final digital asset. However, various problems exist with the current technologies. For example, the prior art does not allow users to preview the final digital asset, which is a composite of other digital assets, before they are combined to mint a new, unique digital asset. Moreover, the prior art may generate physical models based on digital assets, however, the owner of the digital assets cannot create a three-dimensional rendering and test different variations of digital assets before combining into a new asset. As a result, there exists a need for improvements over the prior art and more particularly for a more efficient way of creating a physical three dimensional model based on a plurality of digital assets, wherein the physical three dimensional model is generated by combining a predetermined number of the plurality of digital assets, and wherein a user is provided with a dynamically rendered three-dimensional model, based on a composite of the plurality of digital assets owned by the user, in real-time without provisioning or managing servers.

SUMMARY

A system and method for creating a physical three-dimensional model based on a plurality of digital assets is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method for creating a physical three-dimensional model based on a plurality of digital assets, wherein the physical three-dimensional model is generated by combining a predetermined number of the plurality of digital assets, and wherein a user is provided with a dynamically rendered three-dimensional model, based on a composite of the plurality of digital assets owned by the user, in real-time without provisioning or managing servers. The method comprises receiving, over a communications network from a first computing device, a compressed three-dimensional base model, storing, on a connected database, the compressed three-dimensional base model, receiving, over the communications network from a third computing device, a request to combine a plurality of digital assets having a plurality of characteristics related to the compressed three-dimensional base model, and determining whether the third computing device comprises a predetermined threshold number of the plurality of digital assets. The method further includes, if the predetermined threshold number of the plurality of digital assets is met, then modifying the compressed three-dimensional base model based on the plurality of characteristics of the plurality of digital assets. The method further includes generating a three-dimensional genesis model based on the modified, compressed three-dimensional base model and printing a physical three-dimensional model based on the three-dimensional genesis model. The method further comprises generating a two-dimensional ("2D") graphical representation of the three-dimensional genesis model. The method further comprises sending over the communications network to a blockchain network, at least one of the two-dimensional graphical representation and the three-dimensional genesis model to be stored on the blockchain network and minting a genesis token based on the at least one of the two-dimensional graphical representation and the three-dimensional genesis model stored on the blockchain network. The compressed three-dimensional base model was generating according to a model generation method. The model generation method comprises generating a plurality of base objects, generating a high polygon three-dimensional base model comprising a body assembly of the plurality of base objects, decimating the high polygon three-dimensional base model into a low polygon three-dimensional base model, applying a plurality of materials to each of the plurality of base objects in the body assembly of the low polygon three-dimensional base model, applying a plurality of shaders to at least one of the plurality of materials, and compressing the low polygon three-dimensional base model into a compressed three-dimensional base model. The model generation method further comprises applying Boolean intersection operations on the low polygon three-dimensional base model to define a plurality of planes and generating a plurality of textures, wherein each of the plurality of textures is configured to be received by each of the plurality of materials corresponding to at least one of the plurality of planes. The model generation method further comprises sending, over the communications network to a blockchain network, the plurality of textures and the plurality of base objects to be stored on the blockchain network and minting a plurality of tokens. Each token is associated with one of a texture of a plurality of textures, and a base object of the plurality of base objects that is stored on the blockchain network. The model generation method further comprises generating a two-dimensional projection of the low polygon three-dimensional base model, projecting the two-dimensional projection in a top-down model, and compressing the top-down model of the low polygon three-dimensional base model defining a compressed top-down model. Before generating the three-dimensional genesis model based on the modified, compressed three-dimensional base model, the method further comprises receiving, over the communications network from a first computing device, the compressed top-down base model, storing, on the connected database, the compressed top-down model, sending, over the communications network to the third computing device, a graphical user interface, to be displayed on the third computing device, the graphical user interface comprising a graphical representation of the plurality of textures and a three-dimensional rendering based on at least one of the compressed three-dimensional base model and the compressed top-down model, and continuously updating, in real time, the three-dimensional rendering based on user inputs on the third computing device. Continuously updating continuously updating, in real time, the three-dimensional rendering based on user inputs on the third computing device further comprises receiving selection data, over the communications network from the third computing device, input on the third computing device, wherein the selection data comprising a selected texture of at least one of the plurality of textures, applying the selected texture to at least one of the compressed top-down model, and the compressed three-dimensional base model, which are stored on the connected database, and simultaneously while applying the selected texture, sending, over the communications network to the third computing device, update data comprising an updated three-dimensional rendering of the compressed three-dimensional base model, wherein the update data is configured for updating the graphical user interface to display the updated three-dimensional rendering on the third computing device.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein.

DETAILED DESCRIPTION

Figure 1:
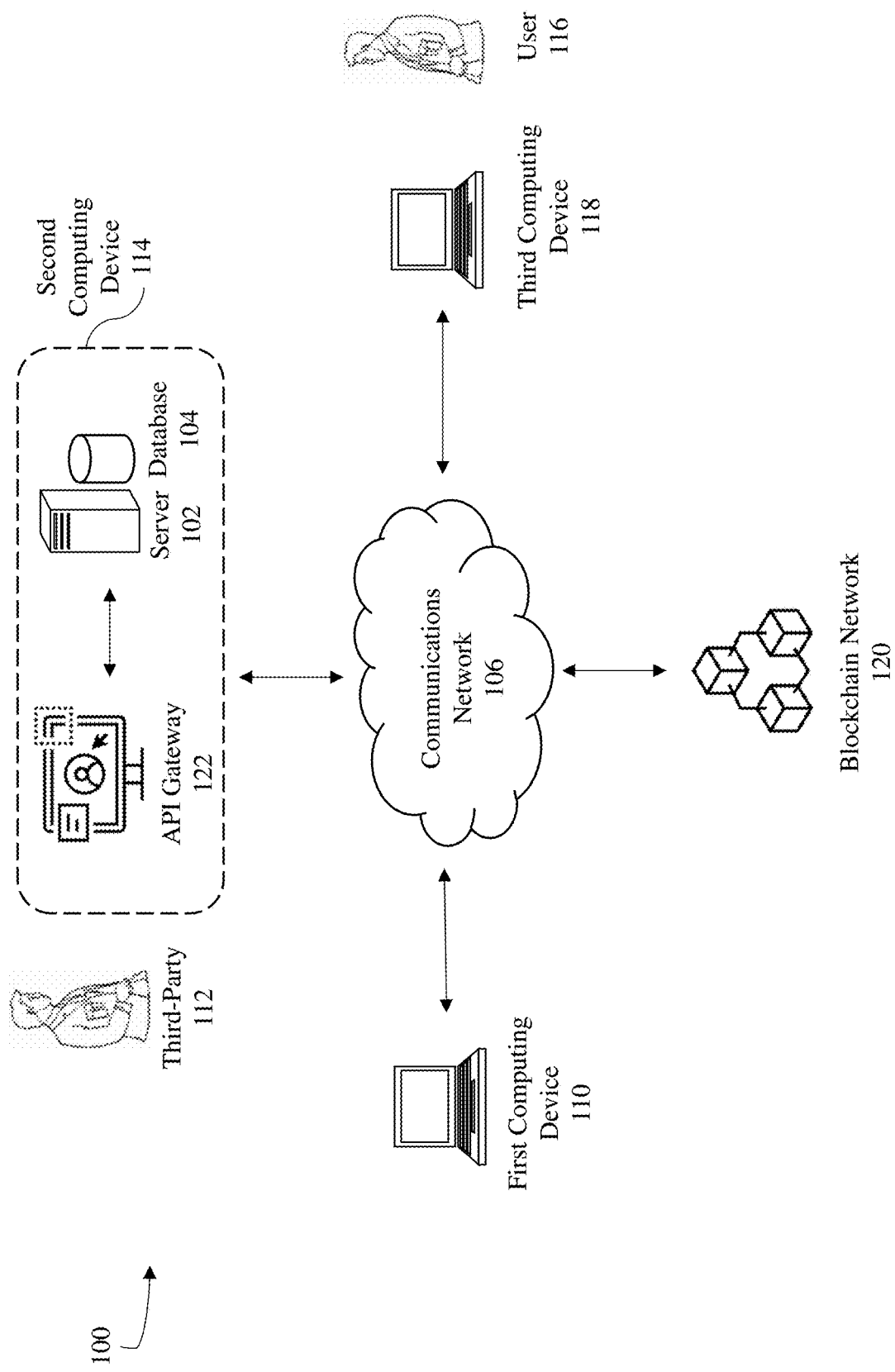
FIG. 1 is a diagram of an operating environment that supports a system for creating a physical three-dimensional model based on a plurality of digital assets, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system and methods that generate a compressed 3D model that can be stored on a serverless system and provide real time dynamic rendering. Generating 3D models stored on a serverless system allows for faster rendering of the 3D models while maintaining the quality of the models. Providing real time dynamic rendering promotes creativity and originality and improves personal value in a non-fungible token. The system and methods further provide the ability to create a 3D model that is not predefined and which is then is stored on the blockchain. The new 3D model is a high resolution model that was generated based on a stored based model. The prior art allows users to combine digital assets without producing a real-time three-dimensional rendering of the composite until the composite token is generated. Likewise, existing technology allows users to combine digital assets to create a physical model based on said assets, however, such technology does not allow the user to combine and test varying combinations of digital assets and render real-time three-dimensional model thereof prior to producing the resulting composite as a physical model and a new digital asset. Further benefits include those associated with web-3 technologies, including, transparency of data, decentralization, increased data privacy, verified ownership and sharing of assets, and incentives to the creators of the digital assets. In other embodiments, the system improves upon the prior art by performing on a web3 network. Web3 refers to the decentralized web, and usually encompasses both decentralized applications (or DApps) and decentralized finance (or DeFi), including cryptocurrencies, assets, or tokens. Unlike traditional databases, web3 technology has no centralized authority or host. It can exist simultaneously on thousands of computers and servers and be both used and shared by everyone in this large, decentralized group. Essentially, it's an open, publicly accessible, distributed ledger that can record transactions between two parties. Utilizing Web3 creates a space where users can read, write, and interact with content safely and securely without losing ownership of their personal data. The methods and systems herein improve upon the prior art by allowing users to interact with their owned digital assets to read, write, and create new digital assets while simultaneously rendering three dimensional models of a composite of the digital assets prior to creation.

Referring now to the Figures, FIG. 1 is a diagram of an operating environment that supports a system for creating a physical three-dimensional model based on a plurality of digital assets, according to an example embodiment. The physical three-dimensional model is generated by combining a predetermined number of the plurality of digital assets. A user is provided with a dynamically rendered three-dimensional model, based on a composite of the plurality of digital assets owned by the user, in real-time without provisioning or managing servers. The operating environment includes a first computing device 110, a second computing device 114 that is provisioned and managed by a third-party 112, a third computing device 118 associated with a user 116. The most prominent element of FIG. 1 is the second computing device 114, which includes an API gateway 122 and a server 102 associated with repository or database 104. The second computing device represents the cloud system provisioned by the third-party. In the present disclosure, the cloud system may be AWS Lambda. However, other cloud system providers may be used and are within the spirit and scope of the present disclosure. The API gateway is programming that allows or blocks access to an Application Programming Interface (API) for usage of backend API and services. In this disclosure, the API gateway serves as a single-entry point for the cloud services of the third-party. The second computing device is coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. In one embodiment, network 106 is a secure network wherein communications between endpoints are encrypted so as to ensure the security of the data being transmitted. Server 102 is a central controller or operator for the functionality that executes on at least computing device 110, via various methods.

The networked environment may also include a blockchain network 120 for storing one or more distributed ledgers that record transactions, such as acquisition of a digital asset. The transactions are bundled into blocks and every block (except for the first block) refers to or is linked to a prior block in the chain. Computer nodes may maintain the blockchain and cryptographically validate each new block and thus the transactions contained in the corresponding block. A ledger is a record-keeping system that tracks the transactions in accounts. Unlike a centralized ledger, the data in the distributed ledger is immutable because the data is stored on multiple nodes, which are connected independent computers in a network, making it impossible to change the information in the data.

A block chain or blockchain is a distributed database that maintains a list of data records on the ledger. The security of the block chain enhanced by the distributed nature of the block chain. A block chain typically includes several nodes. Each of the nodes may be one or more computers, databases, data stores, machines, operably connect to one another. In some cases, each of the nodes or multiple nodes are maintained by different entities. A block chain typically works without a central repository or single administrator. The data records recorded in the block chain are enforced cryptographically and stored on the nodes of the block chain. A block chain provides numerous advantages over traditional databases. The nodes of a block chain may reach a consensus regarding the validity of a transaction contained on the transaction ledger. The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In the present invention, after the user acquires digital assets, such information will be recorded on the blockchain.

Users of the block chain create transactions that are passed around to various nodes of the block chain. A "valid" transaction is one that can be validated based on a set of rules that are defined by the particular system implementing the block chain. For example, in the case of present invention, a valid transaction is acquisition of a digital asset. In some block chain systems, miners are incentivized to create blocks by a rewards structure that offers a predefined per-block reward and/or fees offered within the transactions validated themselves. Thus, when a miner successfully validates a transaction on the block chain, the miner may receive rewards and/or fees as an incentive to continue creating new blocks. Example blockchain networks may include the Ethereum® network, Polkadot® network, Binance® network, Bitcoin® network, Cardano®, etc. Other blockchain networks may be used and are within the spirit and scope of the present invention.

FIG. 1 further includes the first computing device 110 and the third computing device 118, which each may be smart phones, mobile phones, tablet computers, handheld computers, laptops, or the like. The third computing device corresponds to the user 116. Each of the computing devices includes a user interface and/or graphical user interface. In certain embodiments, the system may communicate between the first computing device, the user, the third-party, and the blockchain network, over the communications network, where the first computing device is the system, and the user is a user who purchases the goods and services from the system. The third-party is a provider of the cloud system that acts as the second computing device. The users input selections via a graphical user interface on the third computing device 118 to be sent through the communications network via a data packet and to the second computing device.

FIG. 1 further shows that server 102 includes a database or repository 104, which may be one or more of a relational databases comprising a Structured Query Language (SQL) database stored in a SQL server, a columnar database, a document database and a graph database. Computing devices 110 and 118 may also each include their own database. The repository 104 serves data from a database, which is a repository for data used by server 102 and the mobile devices during the course of operation of the invention. Database 104 may be distributed over one or more nodes or locations that are connected via network 106.

FIG. 1 shows an embodiment wherein networked computing devices 110 and 118 may interact with server 102 and repository 104 over the network 106. Server 102 includes a software engine that delivers applications, data, program code and other information to networked computing devices 110 and 118. The software engine of server 102 may perform other processes such as audio and/or video streaming or other standards for transferring multimedia data in a stream of packets that are interpreted and rendered by a software application as the packets arrive. It should be noted that although FIG. 1 shows only three networked mobile computing devices 110, 114, and 118, the system of the present invention supports any number of networked mobile computing devices connected via network 106, having at least the first computing device 110, the second user computing device 114, and the third computing device 118.

Server 102 also includes program logic comprising computer source code, scripting language code or interpreted language code that is compiled to produce executable file or computer instructions that perform various functions of the present invention. In another embodiment, the program logic may be distributed among more than one of server 102, computing devices 110, 114, and 118, or any combination of the above.

Note that although server 102 is shown as a single and independent entity, in one embodiment of the present invention, the functions of server 102 may be integrated with another entity, such as each of computing devices 110, 114, and 118. Further, server 102 and its functionality, according to a preferred embodiment of the present invention, can be realized in a centralized fashion in one computer system or in a distributed fashion wherein different elements are spread across several interconnected computer systems. While the blockchain network is illustrated as a single entity, the blockchain is actually decentralized, meaning that the data in the blockchain is stored into multiple nodes of the network. The decentralized nature of the blockchain allows the data stored within the blockchain to be immutable.

The third-party 112 may be a single computing device, or system connected computing devices. The third-party is the provisioner of the cloud system, which allows the first computing, or the system, to use data storage and computing power without direct management. For example, the system may use the second computing device to perform the methods disclosed herein. For example, the system may use the second computing device as to render and store three dimensional models and create NFTs for the user.

Figure 3A:
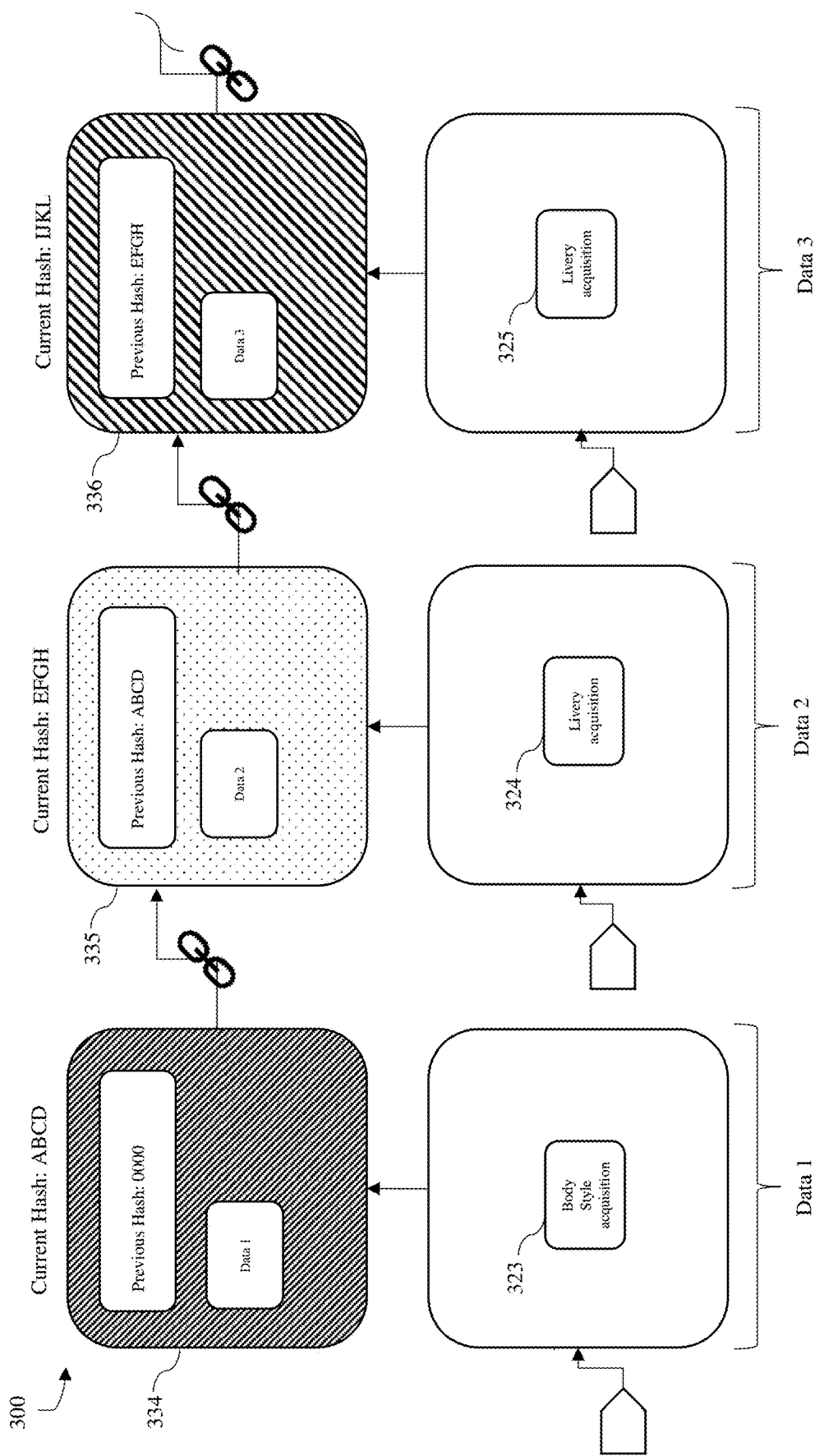
FIG. 3A is a block diagram of the blockchain network pertaining to storing and generating non-fungible tokens, according to an example embodiment.
Figure 3B:
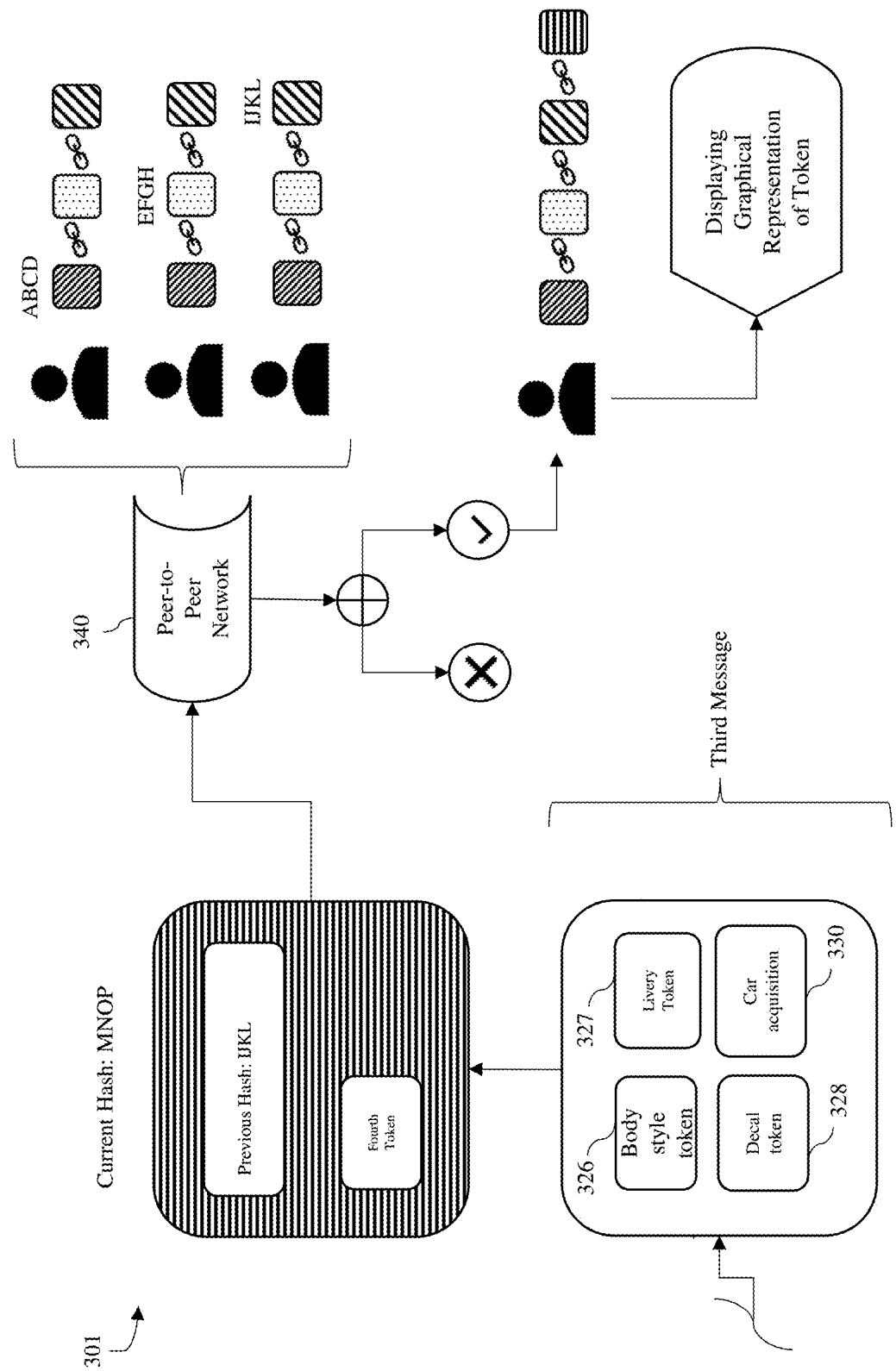
FIG. 3B is a block diagram of the blockchain network pertaining to storing and generating non-fungible tokens, according to an example embodiment.

Referring now to FIGS. 3A and 3B, a block diagram 300 of the blockchain network pertaining to storing and generating non-fungible tokens is shown, according to an example embodiment. After determining whether the third computing device includes a predetermined threshold number of the plurality of tokens, an algorithm is applied to the information 301 before storing the information on the ledger in blockchain format to allow the user to acquire a token. Each of the blocks illustrated in FIG. 3A illustrate a non-fungible token awarded to a user. For example, after confirming that the third computing device includes the predetermined threshold number of the plurality of tokens, an algorithm is applied to the plurality of tokens to produce a hashed value that is stored on the ledger in blockchain format. Each of the blocks 334, 335, 336 includes the plurality of tokens hashed values from each of the plurality of tokens from the user. As illustrated in FIG. 3A, each of the blocks includes data 323, 324, 325 related to the acquisition of a digital asset associated with a user. Referring to FIG. 3B, the most recent block is illustrated being validated by the peer-to-peer network 340. Once the block is validated and stored on the blockchain, the token is given to the user to be displayed on the third computing devices.

By way of example, the user may acquire body styles, liveries, decals, numbers, or other features of a car model. When the user acquires a feature, the system sends information including the acquisition of the feature to the blockchain network. The blockchain network provides the user with an NFT of the feature. Once the user acquires a certain number of NFTs, they may send a request to the system to combine their NFTs to acquire a final car model. Once approved, the system sends information to the blockchain including the NFTs 326, 327, 328 and the acquisition of the final car model 330. The user then receives an NFT of the car from the system so that they may use the car in virtual races.

Figure 2:
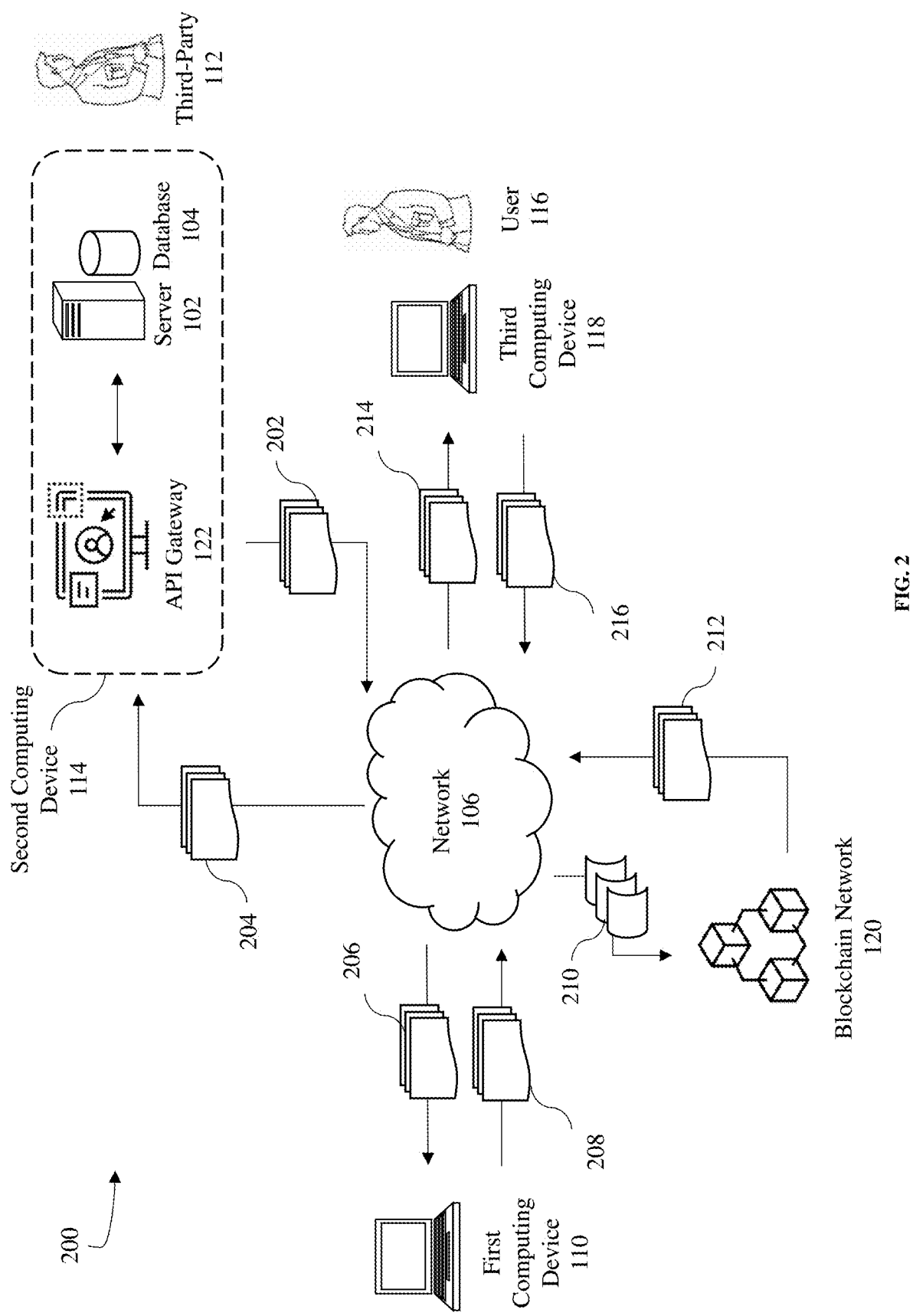
FIG. 2 is a schematic illustrating communication between the entities in FIG. 1 in relation to creating a physical three-dimensional model based on a plurality of digital assets, according to an example embodiment.

The process for creating a physical three-dimensional model based on a plurality of digital assets will now be described with reference to FIGS. 2 and 4 through 6. FIGS. 2 and 4 through 6 depict, among other things, data flow and control flow in the process for creating a physical three-dimensional model based on a plurality of digital assets, according to one embodiment. FIG. 2 is a schematic illustrating communication between the entities in FIG. 1 in relation to dynamically rendering three-dimensional models in real-time and generating a non-fungible token without provisioning or managing servers, according to an example embodiment. It is understood that in FIG. 2, the data packets 202, 204, 206, 208, 210, 212, 214, and 216 are used to show the transmission of data and may be used at different stages of the process. The user 116 may use the third computing device 118 to communicate with the first computing device 110. The first computing device may communicate with the blockchain network 120 and the third-party 112 that uses the second computing device 114. The first computing device may provide graphical user interfaces to each of the first computing device, second computing device, and the third computing device. Each of the graphical user interfaces may be configured to allow the user to interact with the interface, and/or webpage, such that the interface(s) and display(s) may include a plurality of user interface elements such as input controls, navigation components, informational components, and containers. Such user interface elements may include for example, accordions, bento menu(s), breadcrumb(s), button(s), card(s), carousel(s), check box(es), comment(s), doner menu(s), dropdown(s), feed(s), form(s), hamburger menu(s), icon(s), input field(s), kebab menu(s), loader(s), meatball menu(s), modal(s), notification(s), pagination(s), picker(s), progress bar(s), radio button(s), search field(s), sidebar(s), slide control(s), stepper(s), tag(s), tab bar(s), tool tip(s), and toggle(s). Each of these user interface elements may be used in certain embodiments to enable each of the users to interact with the system, provide data to and from the server across the communications network and implement the methods as discussed in FIGS. 4 through 6B. Other user interface elements configured to provide a display to the user to interact with the system in accordance with the methods described herein may be used and are within the spirit and scope of the disclosure. The user may interact with the graphical user interfaces using gestures to trigger certain elements on the graphical user interfaces. A gesture may include computer gestures such as a tap, via a touch sensitive interface display, a click, on or near one of the second user graphical indicators.

Figure 4:
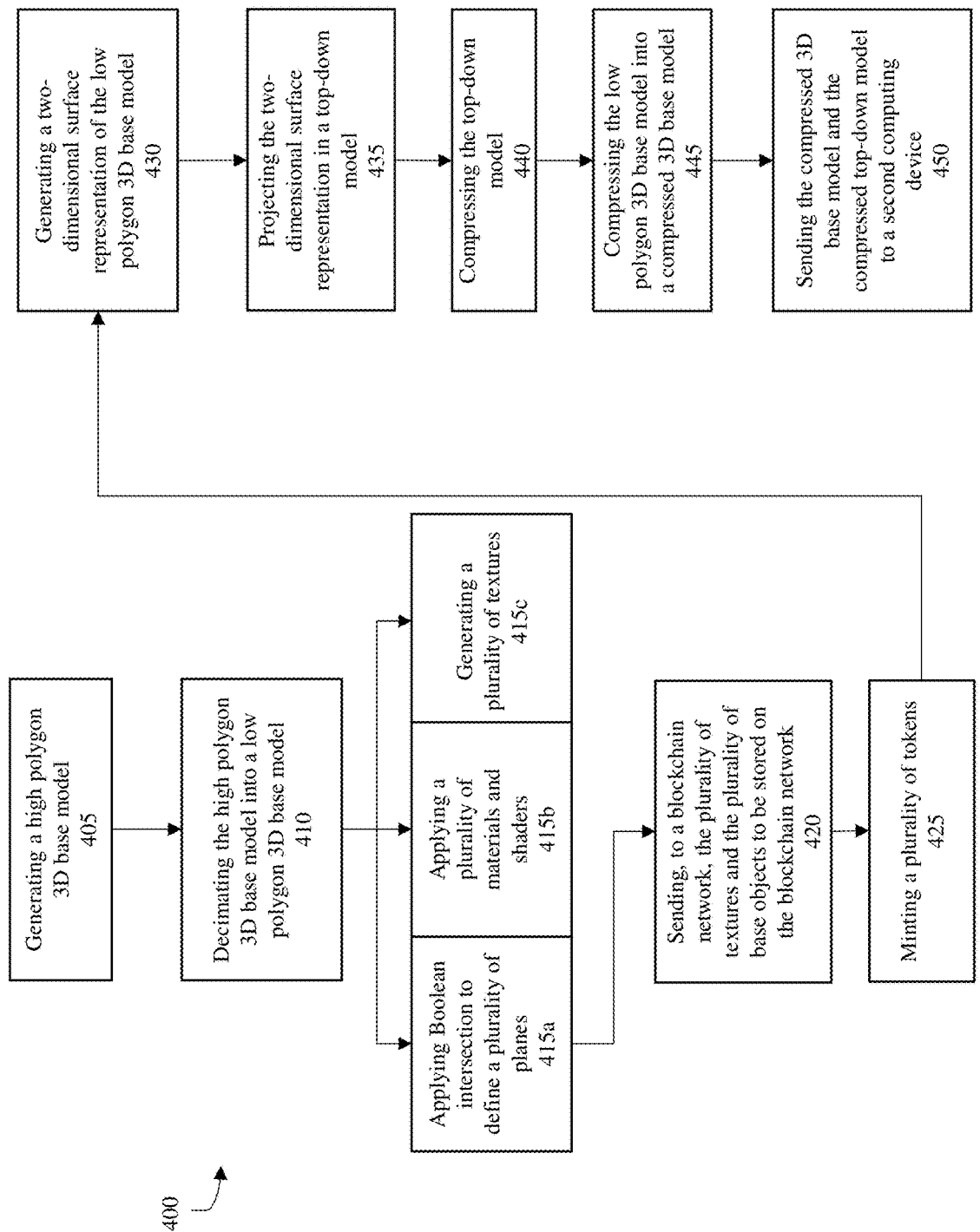
FIG. 4 is a diagram illustrating steps for a method of creating and sending a compressed three-dimensional base model and compressed top-down model from a first computing device, according to an example embodiment.

Referring now to FIG. 4, a diagram illustrating steps for a method 400 of creating and sending a compressed three-dimensional base model and compressed top-down model from a first computing device is shown, according to an example embodiment. The first computing device includes at least one processor configured for performing the steps in method 400. In step 405, the first computing device generates a plurality of base objects. The first computing device then generates a high polygon three-dimensional base model including the plurality of base objects defining a body assembly. By way of example, a wheel may be a base object and the body assembly may be the car having wheels. Other objects for the car may be a hood or a spoiler. Different base objects may be assembled to create different body assemblies even though the different body assemblies may use similar base objects. glTF, which includes the .gltf or .glb file extensions, may be used as the file format for the high polygon three-dimensional base model. A glTF (GL Transmission Format) is a standard file format for three-dimensional scenes and models that supports static models, animation, and moving scenes. However, it is understood that other file formats may be used and are withing the spirit and scope of the disclosed invention. Then, in step 410, the first computing device decimates the high polygon three-dimensional base model into a low polygon three-dimensional base model. Decimating the three dimensional model means decreasing the number of polygons, generally triangles, that define the three dimensional model. The system analyzes the existing high resolution three-dimensional model and decimates the model into the necessary number of polygons based on the information in the model that is determined to be necessary to maintain the overall quality of the model.

To decimate a high-polygon model into a low-polygon model, a variety of software tools can be used. One common approach is to use a decimation modifier within a 3D modeling software. The decimation modifier analyzes the model and reduces the number of polygons based on a variety of settings, such as target polygon count, vertex angle, and edge angle. These settings control how aggressively the modifier reduces the number of polygons and how it prioritizes preserving the details and shape of the model.

Another approach is to use automated software tools that specialize in decimating high-polygon models. These tools use algorithms to analyze the model and reduce the number of polygons while maintaining the overall shape and appearance. These tools can also preserve important details, such as edges, corners, and surface features. Manual methods can also be used to decimate a high-polygon model. This involves manually reducing the number of polygons by deleting vertices and edges or merging polygons. This approach requires significant expertise and can be time-consuming, but it provides the greatest control over the final result.

The necessary number of polygons is an optimal number to efficiently compress and store the rendering while maintaining a high quality model. The low polygon three dimensional model is defined by a model having fewer polygon decimation than the high polygon model. In certain embodiments, the low polygon model has at least 100,000 fewer polygons, such as triangles. Generally, the downside of low polygon models is that they don't look as realistic as high-resolution ones, so if you want to add special effects such as shadows, reflections, and refractions, you need to add them manually by using textures or materials on the model. Therefore, this system improves over the prior art by starting with a high resolution polygon model and optimizing the necessary polygons to create a lower polygon model with high resolution to preserve the necessary data that will maintain the high resolution model yet reduce the data needed to be stored.

Next, in step 415a, the first computing device applies Boolean intersection operations on the low polygon three-dimensional base model to define a plurality of planes. Boolean intersection operations include Boolean intersections, unions, and difference. A Boolean intersection operation on a three-dimensional model can be used to generate a plurality of planes on the model by using a sequence of Boolean operations. First, a plane is defined as a three-dimensional object that extends infinitely in two dimensions but has zero thickness in the third dimension. This plane can be represented as a flat surface in 3D space. To generate a plurality of planes on a 3D model using Boolean intersection operations. The method may further include defining a plane object that intersects the 3D model at the desired location and orientation and then performing a Boolean intersection operation between the plane object and the 3D model. This may create a new 3D object that represents the region where the plane and the model intersect. This is then repeated to generate a plurality of planes. By using this process, multiple planes can be generated on the 3D model that intersect at different locations and orientations. These planes are for slicing the model for 3D printing or analyzing the model's geometry. Additionally, these planes are used to apply the surface textures in precise locations on the model for rendering a completed model with more detailed and realistic visuals. The utilization of the plurality of planes improves the efficiency of the method.

In step 415b, the first computing device applies a plurality of materials to each of the plurality of base objects. Materials are the layers on top of the three low polygon three-dimensional base model. A material controls how a 3D object appears on the screen. This means that most materials will take a texture as a parameter. Materials control the color of the object and how reflective or dull the surface appears. Materials are a set of properties and parameters that define the appearance of a 3D object's surface, such as color, texture, reflectivity, transparency, and roughness. Applying the plurality of materials to the base objects may include accessing a database or materials library. Material libraries typically contain pre-made materials that can be applied to base objects with a single click. These materials may include textures, colors, reflectivity, and other properties that define the appearance of the object.

Another technique is to manually create or edit materials within the software. This can involve adjusting properties such as the diffuse color, specular color, shininess, transparency, and other settings to create a custom material that meets the specific needs of the project. In some cases, materials may be applied to a base object using UV mapping. UV mapping involves unwrapping the 3D model onto a 2D surface, which allows textures to be applied to specific parts of the model. This technique is often used for complex objects that require precise texturing and detailing. Overall, materials can be applied to base objects in a 3D modeling software using a variety of techniques, including material libraries, manual creation and editing, and UV mapping. The specific technique used will depend on the desired appearance of the object and the level of detail required.

In step 415b, the first computing device also applies a plurality of shaders to at least one of the plurality of materials. Shaders modify how the low polygon three-dimensional base model is displayed. Shaders are small programs or scripts that run on the GPU (Graphics Processing Unit), such as the GPU (1203 in FIG. 12) in the exemplary embodiment of a computing device, to perform various calculations and operations related to rendering a 3D object. They determine how an object's surface reacts to lighting, shadows, reflections, refractions, and other visual properties. Shaders can be written in languages such as GLSL (OpenGL Shading Language), HLSL (High-Level Shading Language), or Cg. Other languages configured to write shaders may be used and are within the spirit and scope of the present invention. Shaders work in conjunction with materials to produce the final rendered appearance of an object.

In step 415c, the first computing device generates a plurality of textures. Each of the plurality of textures is configured to be received by each of the plurality of materials corresponding to at least one of the plurality of planes. Textures are 2D images or procedural patterns that are mapped onto the surface of 3D objects to enhance their visual appearance and add realism. Textures are used to represent various surface properties, such as color, roughness, reflectivity, and other attributes that define how an object looks and interacts with light in a virtual scene. The textures change the consistent appearance of the material in order to create pattern in the material. Textures are images used to skin 3D objects, such as colors, decals, logos, patterns, etc.

Generating a plurality of planes on a 3D model and then applying textures, shaders, and materials to the planes offers increased realism, more efficient use of resources, and enhanced control over the final output. By using multiple planes and textures, the system can create more complex and realistic 3D models with more depth and detail. By using multiple textures, the system can allocate different material properties and textures to different parts of the 3D model, which can help optimize the use of resources and improve rendering performance Additionally, the system can have more control over the final output of the 3D model, including the way light and shadows interact with the model's surface, the reflectivity and transparency of different parts of the model, and the overall aesthetic look and feel of the model. In general, using multiple planes and textures allows for more creative freedom and flexibility when designing 3D model, as well as improved realism and performance in the final output.

Defining planes on a 3D model can add benefits by providing more control over how textures are applied to the model surface. While UV mapping (discussed further below with reference to FIG. 4) is an effective way to apply two-dimensional textures onto a 3D model, it has some limitations in terms of how textures are applied and how they appear on the model's surface. By defining planes on the 3D model, the system can apply different textures to different parts of the object's surface and have more control over how those textures are scaled, oriented, and blended together. This can be particularly useful when working with complex or irregularly shaped models, where UV mapping alone may not provide enough control over the way textures are applied. For example, a 3D model of a car may have different planes defined for the body, wheels, windows, and other parts of the car. By applying different textures to each plane, the system can create a more detailed and realistic model, with different textures for the metal body, rubber tires, and transparent windows. The planes can also be mapped to different parts of the UV space, allowing for more efficient use of texture space and more control over how the textures are applied. In general, defining planes on a three-dimensional model can add benefits in terms of increased control over the texture mapping process and more efficient use of texture space, particularly when working with complex or irregularly shaped objects.

Next, in step 420, the first computing device sends data packet 208, over the communications network, the plurality of textures and the plurality of base objects to be received as data packet 210 by the blockchain network and stored on the blockchain network. In step 425, the first computing device mints a plurality of tokens. Each token is a non-fungible token associated with one of a texture of a plurality of textures and a base object of the plurality of base objects that is stored on the blockchain network. Minting a token from a blockchain involves creating a smart contract on the blockchain network that defines the characteristics and properties of the new token. This self-executing code is executed on the blockchain network and defines the rules and logic for the new token. To mint a token, you typically need to define the name, symbol, supply, and other characteristics of the new token, and then create and deploy the smart contract to the blockchain network. Once the smart contract is deployed, you can mint the new tokens by calling the mint function in the smart contract. The tokens can then be managed by transferring them to other users, setting up a marketplace, or integrating them into other applications. While the exact process for minting a token may vary depending on the blockchain network and the tools being used, the general steps involve defining the token characteristics, creating and deploying the smart contract, and minting the new tokens. In certain embodiments, this step is automatically performed by the methods and systems herein.

In step 430, the first computing device generates a two-dimensional surface representation of the low polygon three-dimensional base model. The two-dimensional surface, commonly known as a UV map, is a two-dimensional projection of the low polygon three-dimensional base model. The term "UV" refers to the bidimensional (2D) nature of the process: the letters "U" and "V" denote the axes of the 2D texture because "X", "Y" and "Z" are already used to denote the axes of the 3D model. In certain embodiments, the system may utilize UV texturing which permits polygons that make up a 3D object to be painted with color (and other surface attributes) from an ordinary image.

UV mapping is a crucial step in the 3D modeling and texturing process, as it defines how a 2D texture image is applied onto a 3D model's surface. The goal of UV mapping is to create a correspondence between the 3D model's geometry (vertices, edges, and faces) and a 2D image, also known as a texture map. The term "UV" refers to the two axes (U and V) in the 2D texture space, which are analogous to the X and Y axes in 3D space.

The process of UV mapping begins with unwrapping the 3D model. This involves "cutting" the model along certain edges and "flattening" it onto a 2D plane. The result is a 2D representation of the 3D model's surface, called a UV layout or UV map. The unwrapping process requires careful planning to minimize stretching and distortion of the texture in the final result. A 2D texture map is created, either by painting directly onto the UV layout in a 2D image editing software or by designing the texture separately and then aligning it with the UV layout. The texture map contains color, pattern, and detail information that will be applied to the 3D model. Each vertex of the 3D model is assigned corresponding UV coordinates (U, V) that map it to a specific point on the texture map. This way, the three-dimensional model's geometry is linked to the 2D texture map. The texture map is applied to the 3D model using the UV coordinates. This process, known as texture mapping, determines which part of the texture map corresponds to each face of the three-dimensional model. The result is a three-dimensional model with a realistic appearance, as the texture map provides color, pattern, and detail information that mimic real-world materials. UV mapping is an essential technique in 3D graphics, as it allows artists to create realistic and visually appealing models for use in games, movies, and other digital media.

In step 435, the first computing device projects the two-dimensional surface representation in a top-down model, which may be a UV map. A two-dimensional surface representation of a three-dimensional model is a graphical representation that shows the three-dimensional object as if it were projected onto a two-dimensional plane. This is often done for the purposes of visualization, analysis, or communication. One common technique for creating a 2D surface representation of a 3D model is to use orthographic projection. In orthographic projection, the 3D object is projected onto a plane in a way that preserves the relative sizes and shapes of objects but eliminates perspective and depth. This results in a flat, two-dimensional image that represents the surface of the 3D model. Other methods of creating 2D surface representations of 3D models include using shading and texturing techniques to simulate depth and perspective and using contour lines or cross-sections to show the shape of the object in different planes. These techniques are often used in engineering, architecture, and other fields where it is important to communicate the shape and structure of a 3D object in a clear and concise way. As used herein, the two-dimension surface representation is configured to appear as a three dimensional model on the user interface using a plurality of shading and textures thereby maintaining the high resolution model and allowing rapid rendering based on the selection of a plurality of tokens.

A two-dimensional surface representational, which may be a top-down model, refers to a type of perspective or design approach in which the three-dimensional model is viewed from above. A top down model comprises the use of a central file to define an overall design. This central file can come in the form of an assembly, part, or a design table. Then, in step 440, the first computing device compresses the top-down model of the low polygon three-dimensional base model. As used herein, compressing means to reduce the file size of the model and/or two-dimensional representation. To reduce the file size of a three-dimensional model, the method may include several techniques that can be used to compress the data. One such technique is simplification, which involves reducing the complexity of the model by removing unnecessary details or simplifying the geometry. This is exhibited by decimating the model from high polygon to low polygon model. This can be done manually or using automated software tools that preserve the overall shape and appearance of the model. Another technique is optimization, which involves reducing redundancy and compressing textures and materials to reduce file size. Compression algorithms can also be used to compress the data that represents the model, such as the vertices, polygons, and texture information. These algorithms can be lossless, which preserves the original data, or lossy, which sacrifices some quality to achieve higher compression ratios. Additionally, Level of Detail (LOD) techniques can be used to create different versions of a model with varying levels of detail, depending on the viewer's perspective. Overall, compressing a three-dimensional model requires a combination of these techniques and methods, and the specific approach will depend on the characteristics of the model and the desired level of compression.

In step 445, the first computing device compresses the low polygon three-dimensional base model into a compressed three-dimensional base model. Because the system allows the user to make changes to the three-dimensional model, the system displays the compressed three-dimensional model on the third computing device. The compressed three-dimensional base model and compressed top down model will allow the user to see the changes in-real time because the system will be able to render the compressed three-dimensional model and compressed top-down significantly faster than the high-polygon or low polygon three-dimensional base model. This also allows the system to conserve data to be sent between computing devices, thereby helping the user quickly visualize any changes to the shaders, textures, and materials of the three-dimensional model. Specifically, because the system utilizes the stored model without the need to provision or manage servers of a third-party, said storage of data is generally weighted as a cost. As a result, it is important to reduce the stored data on the servers to minimize the associated storage costs. The methods herein improve over the prior art by reducing the stored data size while maintaining the ability of the user to graphically render, in-real time, a high resolution model. A problem with the prior art is that, to generate a high resolution model, a large dataset needs to be stored and transmitted. As a result, the larger the data set, the more costly the storage of said data and an increase in the rendering time. The methods herein allow the use to render, quickly, a high resolution image based on a compressed dataset, thus improving rendering speed, reducing costs, and maintaining quality.

Additionally, when the user wants to change the textures of the three-dimensional model, using a UV map to apply textures to the top down model allows the system to display the changes to the textures of the three-dimensional model much faster than adding new textures to the plurality of planes. This improves over the prior art because the user can visualize the physical three-dimensional model, which is associated with the compressed three-dimensional model, in real-time using the compressed top-down model.

Next, in step 450, the first computing device sends data packet 208 to the communications network 106. The communications network sends data packet 204 to the second computing device 114. Data packets 208 and 204 include the compressed top-down model and the compressed three-dimensional base model to be stored on the second computing device. In certain embodiments, the system utilizes existing three-dimensional rendering software to generate the three-dimensional models herein. For example, the system and methods may use open source three-dimensional modeling such as Blender™ which is a free and open-source 3D computer graphics software toolset used for creating animated films, visual effects, art, 3D-printed models, motion graphics, interactive 3D applications, virtual reality, and, formerly, video games. Blender's features include 3D modelling, UV mapping, texturing, digital drawing, raster graphics editing, rigging and skinning, fluid and smoke simulation, particle simulation, soft body simulation, sculpting, animation, match moving, rendering, motion graphics, video editing, and compositing. Other three-dimensional modeling software is within the spirit and scope of the disclosure.

Figure 5:
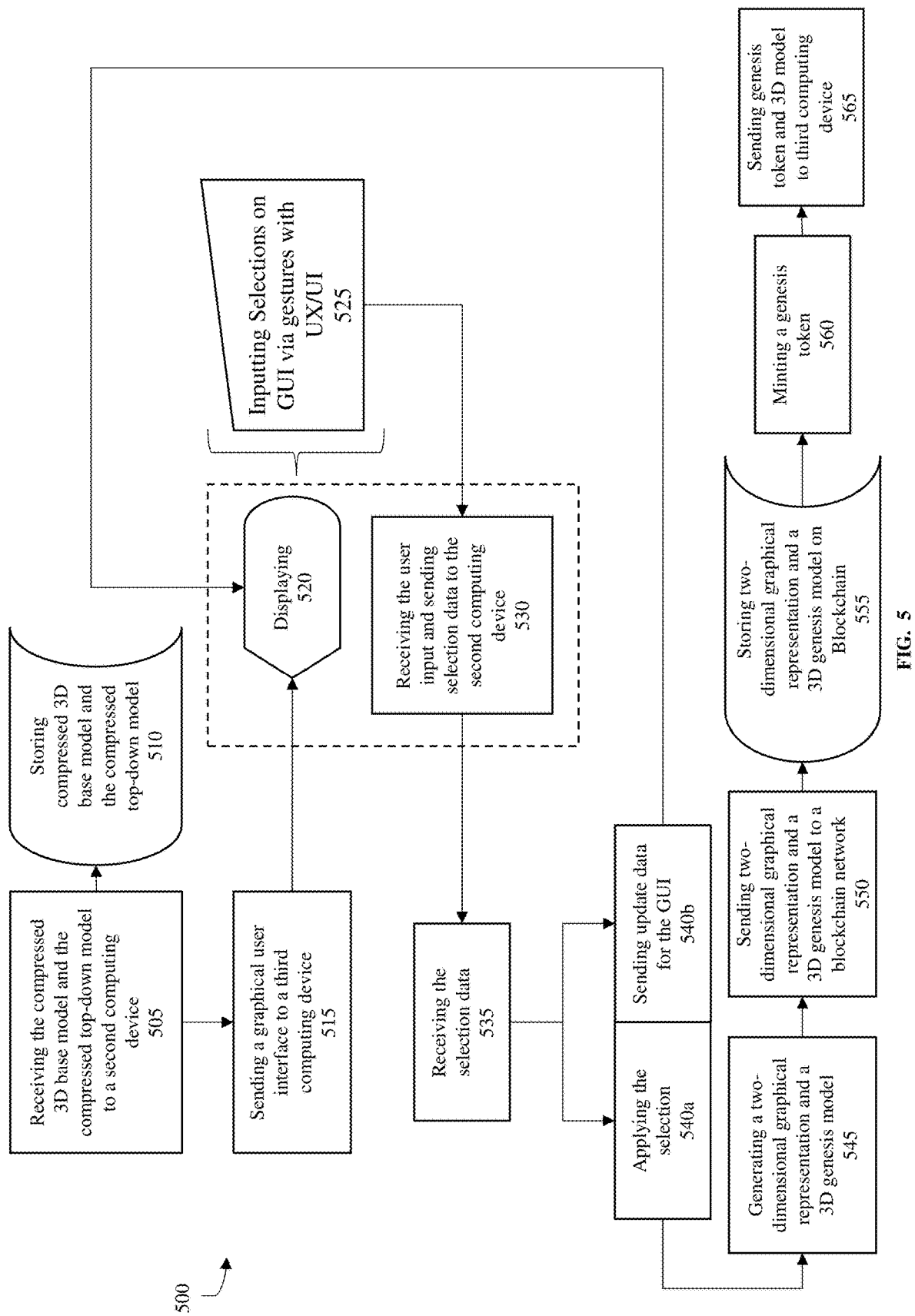
FIG. 5 is a diagram illustrating steps for a method of creating and sending an NFT and three-dimensional model from a second computing device, according to an example embodiment.

Referring now to FIG. 5, a diagram illustrating steps for a method 500 of creating and sending an NFT and three-dimensional model from the second computing device is shown, according to an example embodiment. The second computing device includes at least one second processor configured for performing the steps in method 500. In step 505, the second computing device receives data packet 204 that includes a compressed top-down model and a compressed low dimensional base model to be stored on the connected database of the second computing device. The compressed top-down model and the compressed low dimensional base model were generated using the first computing device. In step 510, the second computing device stores the compressed top-down model and the compressed three-dimensional base model in the cloud system. Next, in step 515, the second computing device sends data packet 202, which includes a graphical user interface configured for being displayed on the third computing device, to the network 106. The network sends data packet 214, which includes the graphical user interface, to the third computing device. The graphical user interface includes a three-dimensional rendering based on the compressed three-dimensional base model and the plurality of textures. Then, the third computing device displays the graphical user interface in step 520. In step 525, the user inputs a selected body assembly of the plurality of body assemblies and a selected texture of at least one of the plurality of textures on the graphical user interface via gestures with UX/UI elements. In an example embodiment, the user may select a body assembly and textures using the graphical user interface illustrated in FIG. 11. The selected body assembly defines a selected compressed three-dimensional base model of a plurality of compressed three dimensional base models. In step 530, the third computing device receives the selection data, including the selected texture, from the user and sends data packet 216 including selection data to the network 106. Next, the second computing device continuously updates, in real time, the three-dimensional rendering based on user inputs on the third computing device. Continuously updating in real-time refers to a process in which data or information is continually updated and displayed or processed immediately as soon as the updates occur, without any significant delay. This means that any changes or updates made to the data or information are immediately reflected and available to the user in real-time. Continuously updating the three-dimensional rendering in real time includes at least steps 535, 540*a*, and 540*b*. In some embodiments, continuously updating the three-dimensional rendering in real time may include additional steps to promote continuous updates of the three-dimensional rendering in real time. Then, in step 535, the second computing device receives data packet 204 including the selection data. In step 540*a*, the second computing device applies the selected texture to at least one of the plurality of planes. Simultaneously, in step 540*b*, while applying the selected texture, the second computing device sends data packet 202 across the communications network to be received by the third computing device as data packet 214, which includes update data comprising an updated three-dimensional rendering of the compressed three-dimensional base model. The update data is configured for updating the graphical user interface to display the updated three-dimensional rendering on the third computing device. The updated three-dimensional rendering of the compressed three-dimensional model includes the selected textures. When selecting at least one of the plurality of textures, the three-dimensional rendering is updated to portray the selected texture on the compressed three-dimensional base model and/or the compressed top-down model.

Next, in step 545, the second computing device generates at least one two-dimensional graphical representation of the updated three-dimensional rendering of the modified, compressed three-dimensional base model. The second computing device also generates a three-dimensional genesis model based on the modified, compressed three-dimensional base model, which is presented to the user by the updated three-dimensional rendering. The term "genesis model" would refer to a customized or modified version of the original base model. The genesis model would be a derivative of the original base model, with some or all of its attributes and features modified or customized to suit the specific needs or preferences of the creator or user. The genesis model is a new, unique model based on the attributes associated with the plurality of tokens and the base model. The two-dimensional graphical representations are images that help identify a three-dimensional genesis model. The second computing device also prints a physical three-dimensional model based on the three-dimensional genesis model, which was generated based on the modifications to the compressed three-dimensional based model, and the plurality of tokens. In step 550, the second computing device sends data packet 202 including at least one of the two-dimensional graphical representation and the three-dimensional genesis model to generate a non-fungible token to the communications network 106. The blockchain network 120 receives, from the communications network, data packet 210 including the at least one of the two-dimensional graphical representation and the three-dimensional genesis model to generate a non-fungible token. In step 555, the blockchain network stores the two-dimensional graphical representations and the three-dimensional genesis model on the blockchain. In step 560, the first computing device mints a genesis token based on the at least one of the two-dimensional graphical representation and the three-dimensional genesis model stored on the blockchain network, that were each generated based on the compressed three-dimensional base model. The genesis token is a non-fungible token associated with the two-dimensional graphical representation and the three-dimensional genesis model. In step 565, the first computing device sends data packet 208, including the genesis token and the three-dimensional model, over the communications network. Then, the third computing device received data packet 214, including the genesis token and the three-dimensional model sent by the first computing device, from the communications network.

In other words, the system generates the three-dimensional rendering and applies textures using UV mapping to quick processing to allow the user to view their selection on-demand. When it comes to creating the final product, in this case, the three-dimensional genesis model, the system creates the plurality of planes to apply textures because it offers higher levels of detail. This is more visually appealing for users and helps the system print a high quality physical three-dimensional model. In other embodiments, the methods performed by the second computing device described herein may be performed by the first computing device.

Figure 6:
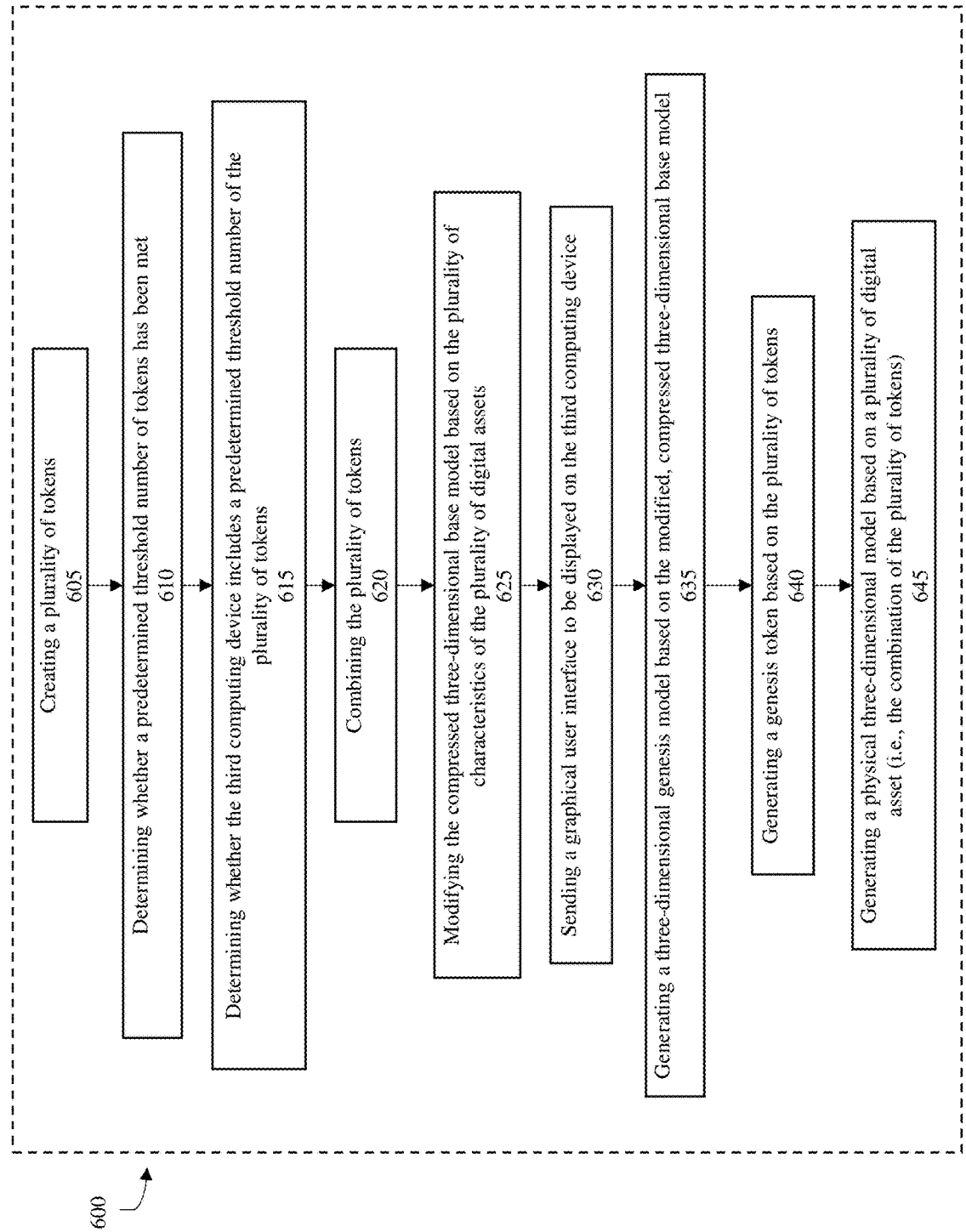
FIG. 6 is a diagram illustrating steps for a method of generating a plurality of tokens and a physical three-dimensional model, according to an example embodiment.

Referring now to FIG. 6, a diagram illustrating steps for a method 600 of creating a physical three dimensional model based on a plurality of digital assets is shown, according to an example embodiment. The physical three dimensional model is generated by combining a predetermined number of the plurality of digital assets. The user is provided with a dynamically rendered three-dimensional model, based on a composite of the plurality of digital assets owned by the user, in real-time without provisioning or managing servers. In step 605, the first computing device generates a plurality of tokens associated with the user. Then, in step 610, the second computing device receives, from a third computing device, a request to combine the plurality of tokens which are stored on the third computing device. In another embodiment, the second computing device may receive a request to combine a plurality of digital assets having a plurality of characteristics related to the compressed three-dimensional base model. The third computing device sends data packet 216 including said requests to be received as data packet 204 by the second computing device. Then, in step 615, the second computing device determines whether the third computing device includes a predetermined threshold number of the plurality of tokens or of the plurality of digital assets. A predetermined number of tokens is a specific quantity of tokens that a user must possess or acquire in order to render a new three-dimensional model within a digital platform or system. A predetermined number of digital assets is a specific quantity of digital assets that a user must possess or acquire in order to render a new three-dimensional model within a digital platform or system. In a first embodiment, the token is a non-fungible token. In this case, the non-fungible tokens may represent unique digital assets or tokens that are used to unlock or access specific attributes or features of the model. For example, a non-fungible token may represent ownership of a specific body style or texture, and a user would need to possess or acquire the appropriate tokens to access these attributes when rendering a new 3D model. The predetermined number of tokens required to render a new three-dimensional model may still vary based on the specific attributes or features selected by the user, with each non-fungible token representing a specific attribute or feature. Overall, in this context, the predetermined number of tokens required to render a new three-dimensional model may represent a measure of ownership or access rights to specific attributes or features of the model, with each non-fungible token representing a specific attribute or feature, or material of the physical model to be generated.

In another embodiment, the token is a form of currency or payment. In this context, the tokens can represent a form of currency or value exchange within the system, and the ability to render a new 3D model may require the possession or acquisition of a certain number of tokens. This requirement may be in place to incentivize users to engage with the platform or to limit the number of renders performed to prevent abuse or overuse of the system. Overall, in this embodiment, said predetermined number of tokens may be a specific amount of currency within the platform that is required to access the feature of rendering a new 3D model.

In step 620, the second computing device combines the plurality of tokens associated with the digital assets acquired by the user. In step 625, if the predetermined threshold number of the plurality of tokens is met, the first computing device modifies the compressed three-dimensional base model based on the plurality of characteristics of the plurality of digital assets acquired by the user. In the present embodiment, the plurality of characteristics may be body style, materials, textures, and other characteristics configured to modify the appearance of the compressed three-dimensional model. In step 630, if the predetermined threshold number of the plurality of tokens is met, then the second computing device sends, over the communications network to the third computing device, a graphical user interface configured for being displayed on the third computing device. The graphical user interface includes the three dimensional rendering of the compressed three dimensional base model and the plurality of textures. In step 635, the first computing device generates the three-dimensional genesis model based on the modified, compressed three-dimensional base model. The three-dimensional genesis model is generated using the abovementioned processes configured for high levels of detail and quality. In step 640, the second computing device generates a genesis token based on the combination of the plurality of tokens. In step 645, the first computing device generates a physical three-dimensional model based on a plurality of digital assets (i.e., the combination of the plurality of tokens) and the three-dimensional genesis model. The system may generate the physical three-dimensional using processes such as 3D printing. However, other processes may be used and are within the spirit and scope of the present disclosure. For example, there are several methods for generating a physical 3D model based on an electronic model. One of these methods is CNC machining, which involves a computer-controlled machine removing material from a block of material to create a physical object based on a 3D model. Injection molding is another process where a mold is created based on a 3D model, and molten material is injected to create a physical object. Laser cutting is used to cut or etch material based on a 3D model, while casting involves pouring liquid material into a mold based on a 3D model. These methods can produce high-quality, precise parts from a variety of materials and can be used to produce large quantities of parts with high precision. The choice of method depends on factors such as the desired materials, quantity, and level of precision required. In other embodiments, the methods performed by the second computing device described herein may be performed by the first computing device, and vice versa.

Figures 7A, 7B:
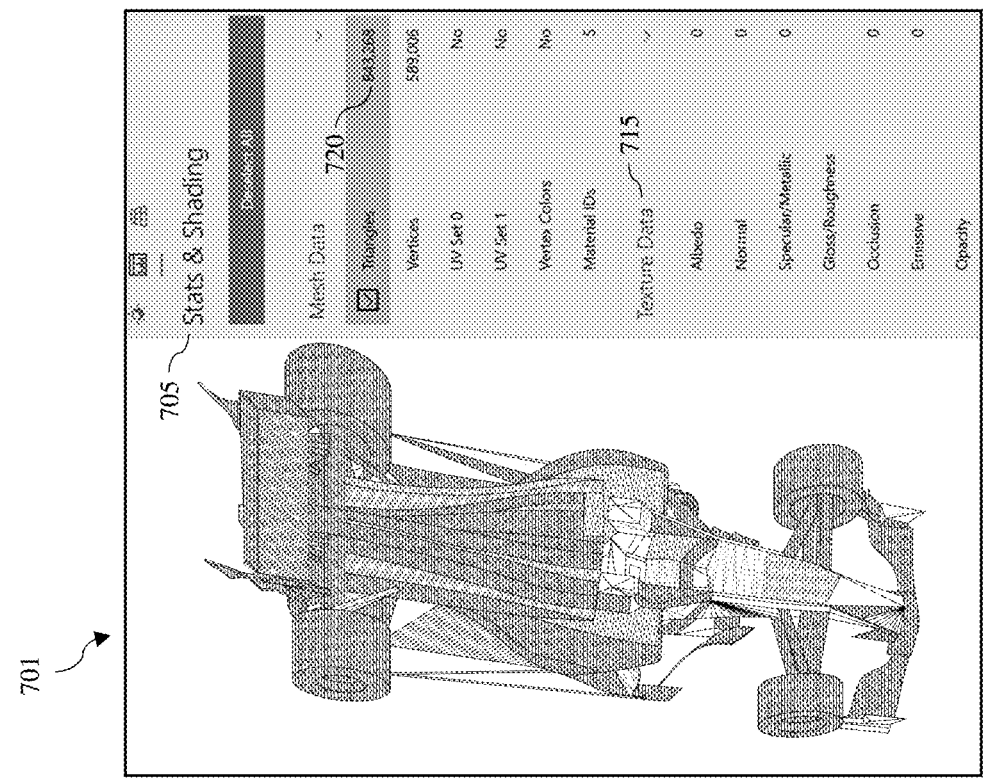
FIG. 7A is a diagram illustrating a high polygon three-dimensional model, according to an example embodiment.
FIG. 7B is a diagram illustrating a low polygon three-dimensional model, according to an example embodiment.

Referring now to FIGS. 7A and 7B, diagrams illustrating a high polygon three dimensional model 700 and a low polygon three dimensional model 701, respectively, are shown, according to an example embodiment. The diagram incudes the statistics and shading 705 of the mesh data 710 and texture data 715 for the low polygon three-dimensional base models. The statistics of the mesh data may include the number of triangles 720, number of vertices, UV sets, vertex colors, and material IDs. The statistics of the texture data may include values for effects such as albedo, normal, specular/metallic, gloss/roughness, occlusion, emissive, and opacity. The number of triangles in the high polygon three-dimensional model is larger number of triangles in the low-polygon three-dimensional model.

High polygon models and low polygon models are two types of 3D models that differ in the number of polygons used to create their geometry. Polygons, typically composed of triangles or quadrilaterals, are the building blocks of 3D models. The key differences between high and low polygon models are in their level of detail, performance, and purpose. High polygon models contain a large number of polygons, resulting in more intricate shapes and finer details. This creates a more realistic and visually appealing model, suitable for close-up shots, detailed rendering, or high-quality visualizations. Low polygon models, on the other hand, have fewer polygons, which results in a simpler and more stylized representation of the object. They lack the fine details found in high polygon models but are still recognizable and visually coherent. High polygon models are more resource-intensive due to their complexity, requiring more memory and processing power for rendering and animation. This can lead to slower performance and increased rendering times, especially in real-time applications like video games or virtual reality. Low polygon models are more "lightweight" and optimized for performance, as they consume fewer resources and render more quickly. This makes them ideal for real-time applications where maintaining a high frame rate is crucial, such as video games, mobile applications, or virtual and augmented reality experiences. High polygon models are typically used in scenarios where visual fidelity and realism are of utmost importance, such as pre-rendered animations, visual effects, advertising, architectural visualization, and product design. Low polygon models are primarily used in real-time applications where performance is critical, and the model will be viewed from a distance or on devices with limited resources. In some cases, artists create high polygon models to generate detailed textures and normal maps, which can then be applied to low polygon models. This process, known as baking, allows the low polygon models to appear more detailed and visually appealing while maintaining their performance advantages.

Figure 8A:
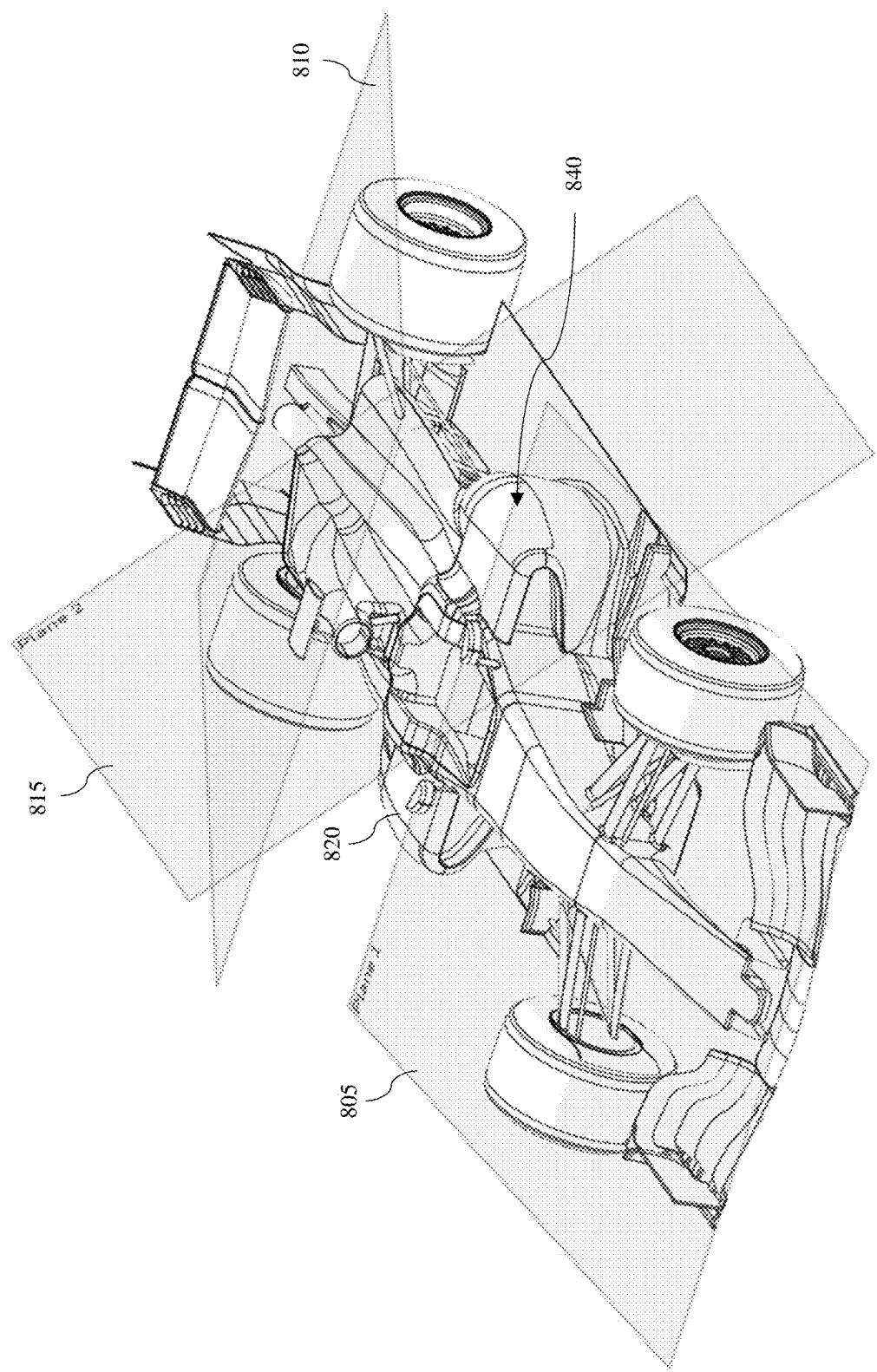
FIG. 8A is a perspective view of a three-dimensional model including a plurality of planes, according to an example embodiment.
Figure 8B:
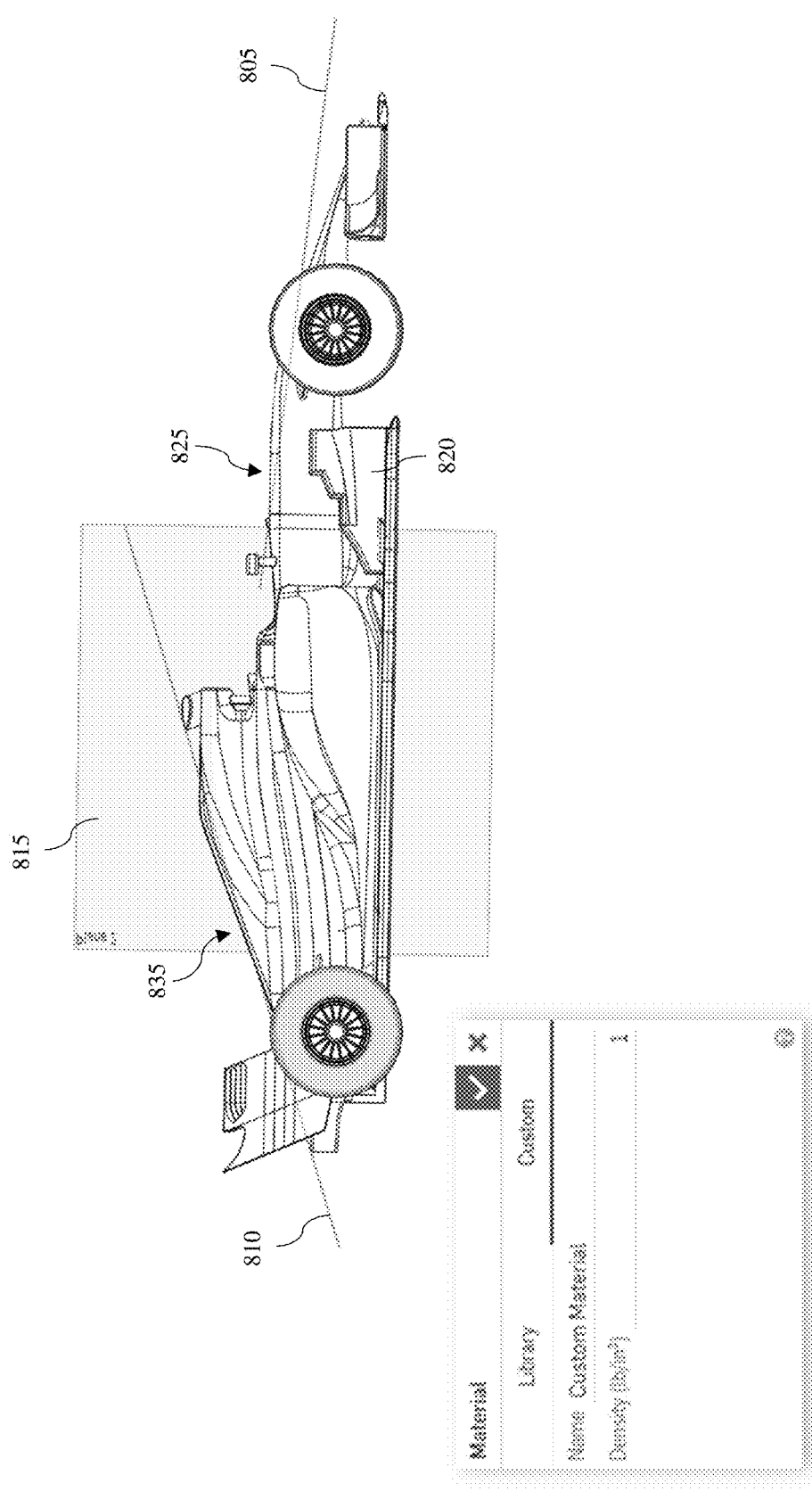
FIG. 8B is a side view of the three-dimensional model including the plurality of planes, according to an example embodiment

Referring now to FIGS. 8A and 8B, views of a three-dimensional model including a plurality of planes are shown, according to an example embodiment. FIG. 8A is a perspective view of a three-dimensional model including a plurality of planes, according to an example embodiment. FIG. 8B is a side view of a three-dimensional model including the plurality of planes, according to an example embodiment. The plurality of planes includes a first plane 805, a second plane 810, and a third plane 815. The first plane is on a top surface 825 of the body assembly 820. The top surface of the body assembly is the surface of the body assembly that is proximately above the front wheels. The second plane is on a back surface 835 of the body assembly. The back surface of the body assembly is the surface of the body assembly that is proximately above the rear wheels. The third plane is on a side surface 840 of the body assembly. It is understood that the embodiment is not limited to three planes, and the number of planes may be changed depending on the specific data and performance requirements. In some embodiments, the system generates more planes for highly detailed models.

Figure 9:
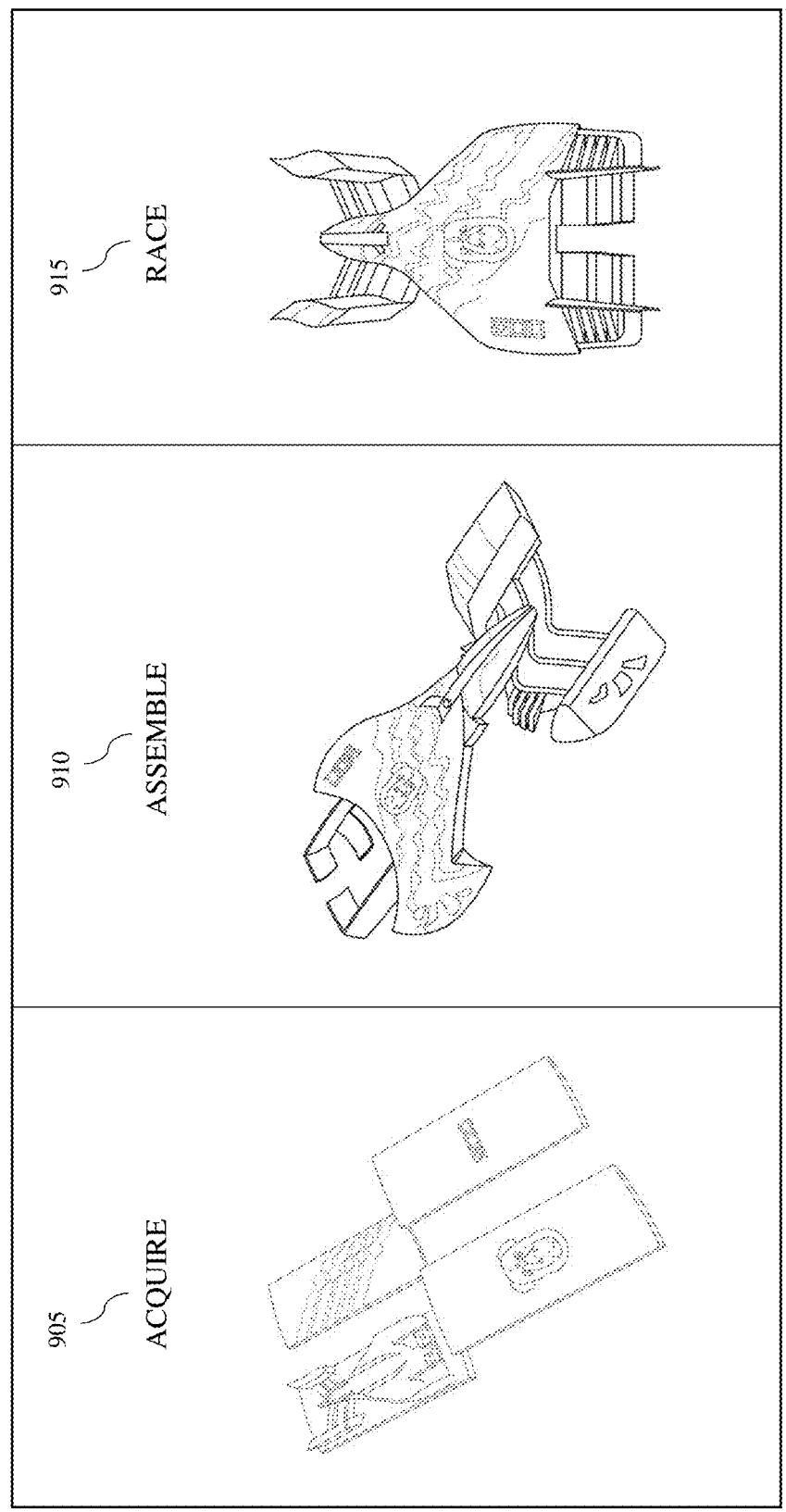
FIG. 9 is a diagram illustrating a graphical user interface configure to generate and utilize the three-dimensional model, according to an example embodiment.

Referring now to FIG. 9, a diagram illustrating a graphical user interface configured to display on a third computing device to generate and utilize the three-dimensional model is shown, according to an example embodiment. The graphical user interface may include a variety of user interface/user experience elements configured to allow the user to interact with the graphical user interface. may be configured to allow the user to interact with the graphical user interface, and/or webpage, such that the interface(s) and display(s) may include a plurality of user interface elements such as input controls, navigation components, informational components, and containers. Such user interface elements may include for example, accordions, bento menu(s), breadcrumb(s), button(s), card(s), carousel(s), check box(es), comment(s), doner menu(s), dropdown(s), feed(s), form(s), hamburger menu(s), icon(s), input field(s), kebab menu(s), loader(s), meatball menu(s), modal(s), notification(s), pagination(s), picker(s), progress bar(s), radio button(s), search field(s), sidebar(s), slide control(s), stepper(s), tag(s), tab bar(s), tool tip(s), and toggle(s). The graphical user interface may include interactable elements that may display other graphical user interfaces. The other graphical user interfaces may be configured to allow the user to acquire 905 NFTs, assemble 910 NFTs to generate another NFT, and race 915 their assembled NFTs. Racing 915 is specific to the application such that the three dimensional model and/or token can be utilized in a game or experience. The methods herein improve upon the prior art by providing a unique genesis token which can be involved in digital gaming and entertainment experiences while also producing a physical representation thereof for in-person entertaining experiences and competitions. Racing, whether digital or physical may include physical/virtual cars, drivers, tracks, and other racing-related items that are unique and ownable by individuals who hold the corresponding NFTs. Additionally, such ownership of digital tokens can be used to grant access rights to real-world experiences, memorabilia, and other collectibles for example.

Figure 10:
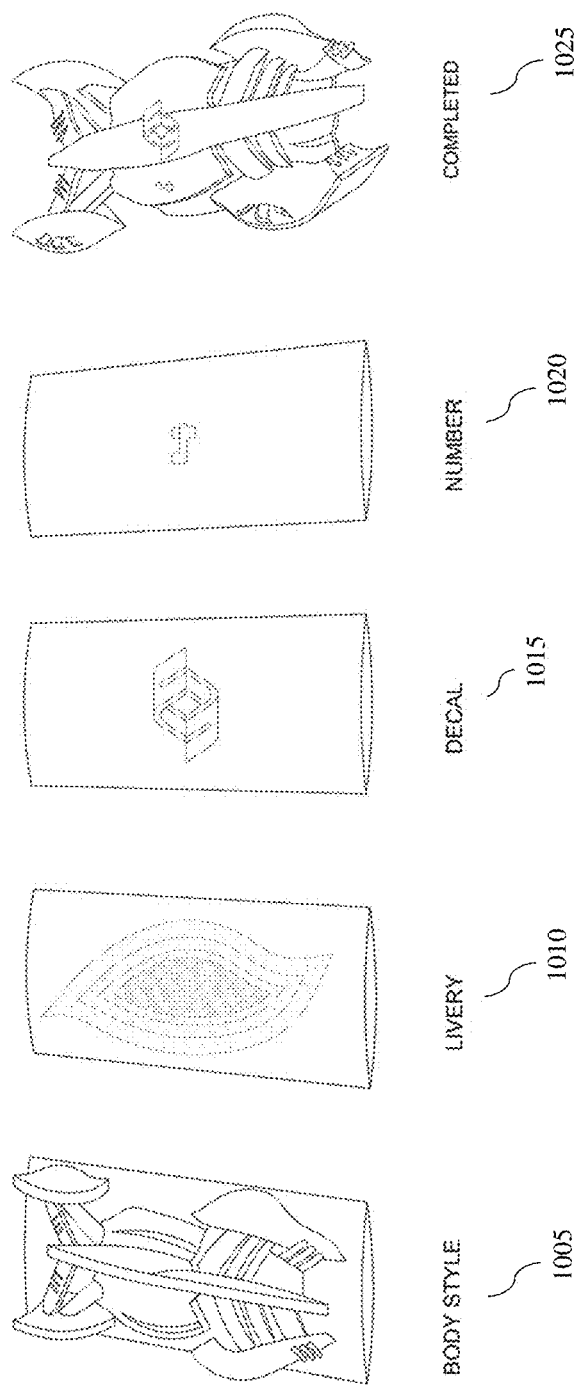
FIG. 10 is a diagram illustrating visual representations of a plurality of tokens and a three-dimensional rendering of a composite thereof, according to an example embodiment.

Referring now to FIG. 10, a diagram illustrating visual representations of a plurality of tokens and a three-dimensional rendering of a composite thereof is shown, according to an example embodiment. The graphical user interface may display visual representations of the plurality of tokens that is combined to generate another token. The plurality of tokens is represented by the body style 1005, the livery 1010, the decal 1015, and the number 1020. In other embodiments, the user may need to acquire other tokens including different textures. The last token is represented by the completed three-dimensional model 1025, which is acquired by combining the plurality of tokens.

Figure 11:
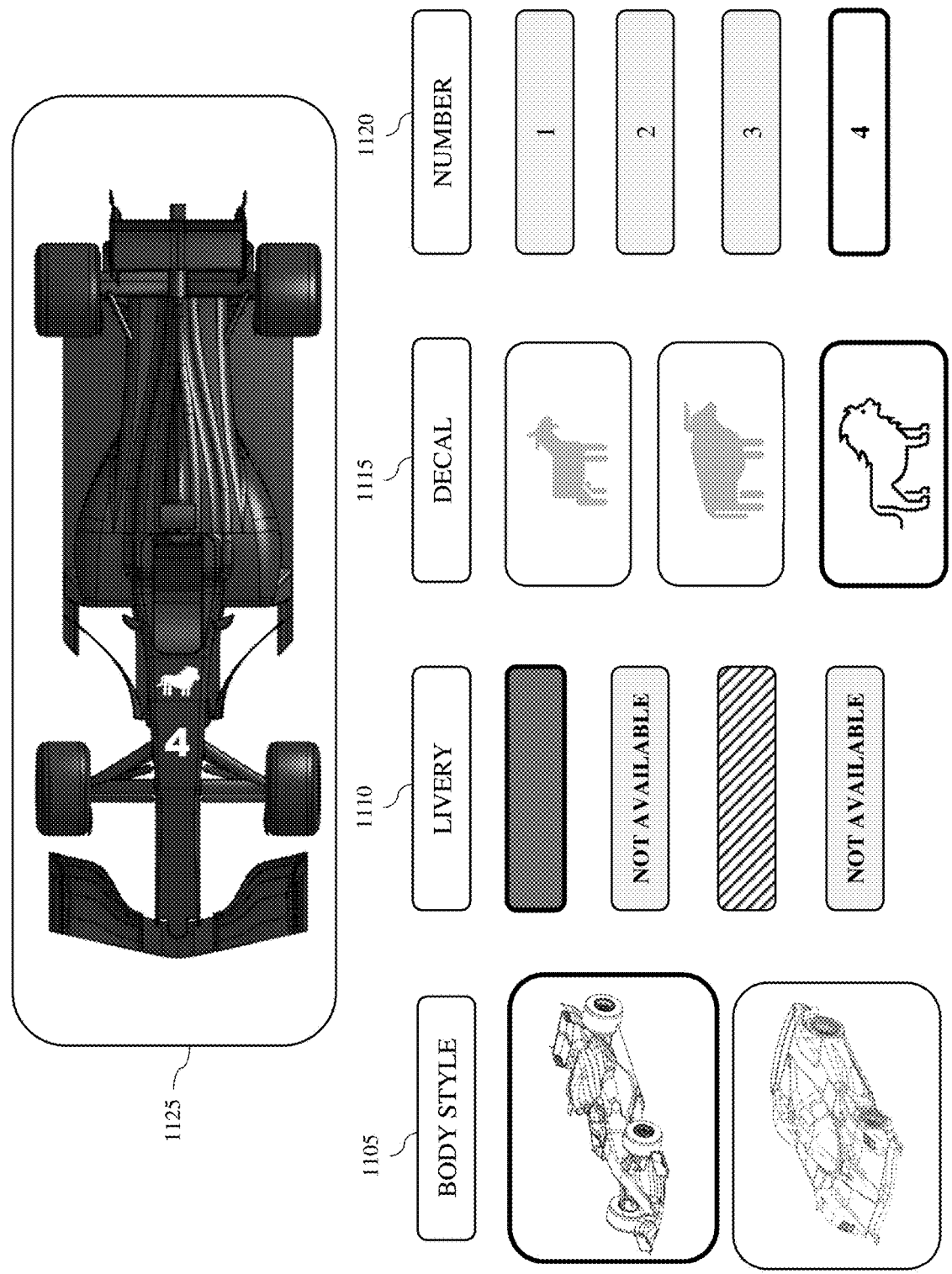
FIG. 11 is a diagram illustrating a graphical user interface configured to display on the third computing device, according to an example embodiment.

Referring now to FIG. 11, a diagram illustrating a graphical user interface configured to display on the third computing device is shown, according to an example embodiment. The graphical user interface allows the user to input selection data by displaying the options for each of the plurality of tokens to choose from. In the present embodiment, the graphical user interface displays options for a body style 1105, a livery 1110, a decal 1115, and a number 1120. The graphical user interface also displays the updated three-dimensional rendering 1125 of the three-dimensional base model as the user chooses different options. Because the system uses a compressed three-dimensional model and applies textures via two-dimensional surface representations, the system can quickly render the selected body style and selected textures such that the users receive real-time feedback for their selections. When users are satisfied with their selections and want to finalize their modified three-dimensional base model, those selections are applied to a three-dimensional genesis model. The system generates the three-dimensional genesis model using high-quality methods including the plurality of planes to apply textures. This allows the system to print the physical three-dimensional model in a high level of detail to promote the quality of the physical three-dimensional model.

In the example embodiment, the three-dimensional rendering is based on the compressed top-down model. In some embodiments, the three-dimensional rendering is based on the compressed three-dimensional base model. In other embodiments, there may be more body style and texture options available to the user. In some embodiments, the system provides on-demand texture management to allow users to quickly preview different textures on the three dimensional model by using React-based models, a set of custom hooks, and dynamic configurations per asset type. React is an open-source JavaScript library for developing user interfaces. Hooks are JavaScript functions that allow access to React features without the use of classes. Dynamic configurations per asset type allow the user to apply textures to any part of an asset, which may be the three dimensional model displayed on the graphical user interface. Additionally, the system may use Draco, which is Google's® compression library, with the React-based models to more efficiently preload the three-dimensional models. The combination of these processes allows the user to quickly view the different options for any of the body style 1105, livery 1110, decal, 1115, and number 1120 when interacting with the graphical user interface. The combination of these processes according to the methods described herein improve over the prior art to provide a system for dynamically rendering three-dimensional models in real-time.

Figure 12:
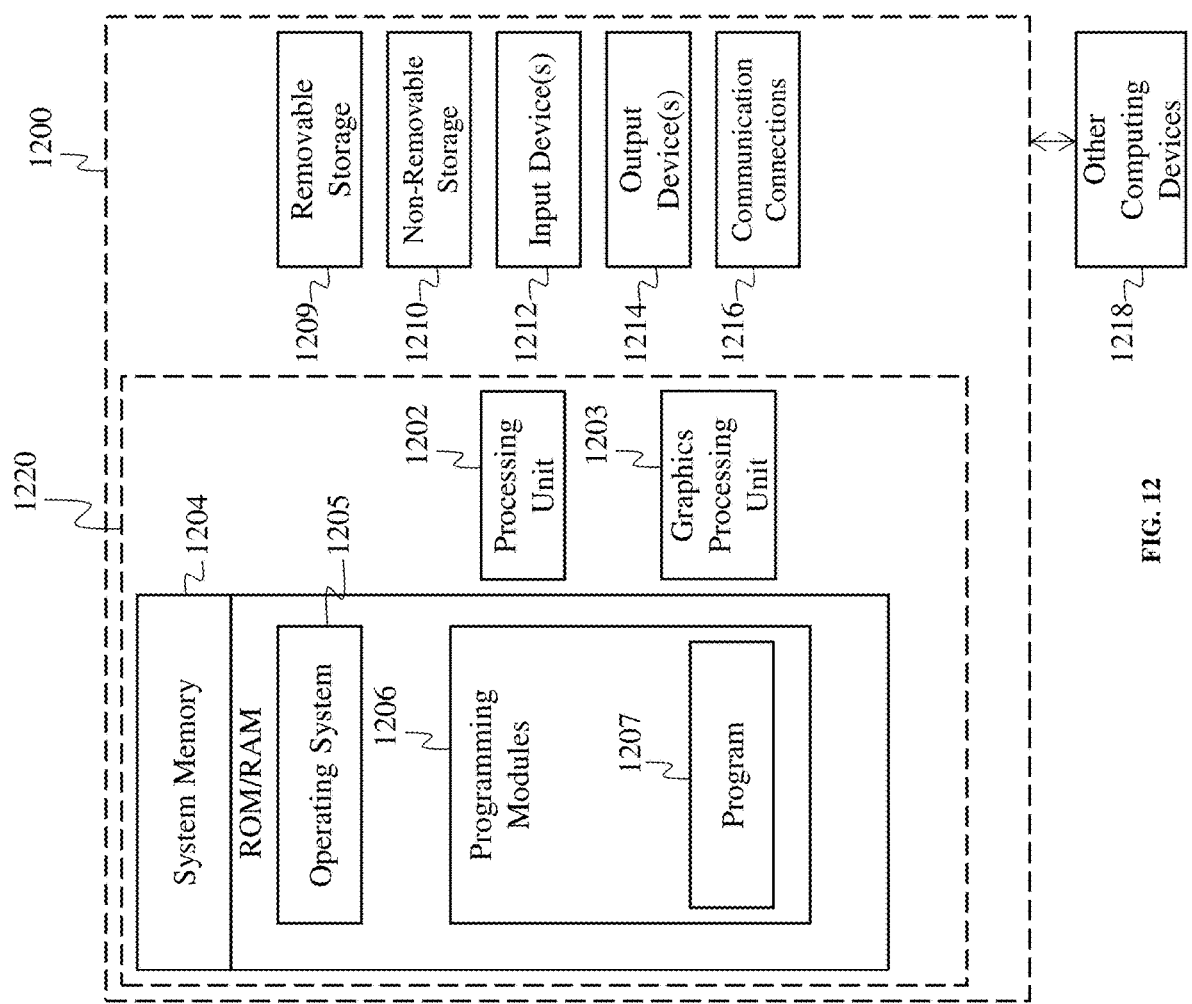
FIG. 12 is a block diagram of a system including a computing device and other computing devices, according to an exemplary embodiment of present technology.

Referring now to FIG. 12, a block diagram of a system including an example computing device 1200 and other computing devices is shown, according to an exemplary embodiment of present technology. Consistent with the embodiments described herein, the aforementioned actions performed by devices 110, 114, and 118 may be implemented in a computing device, such as the computing device 1200 of FIG. 12. Any suitable combination of hardware, software, or firmware may be used to implement the computing device 1200. The aforementioned system, device, and processors are examples and other systems, devices, and processors may comprise the aforementioned computing device. Furthermore, computing device 1200 may comprise an operating environment for systems 100 and processes 400, 500, 600 and other described herein, providing data related to data flow 200 and GUIS illustrated in FIG. 5 described above. Processes 400, 500, 600 and other described herein, data related to data flow 200 and other described herein and GUI illustrated in FIG. 11 and others described herein may operate in other environments and are not limited to computing device 1200.

With reference to FIG. 12, a system consistent with an embodiment of the invention may include a plurality of computing devices, such as computing device 1200. In a basic configuration, computing device 1200 may include at least one processing unit 1202 and a system memory 1204. In addition, computing device 1200 may include at least one graphics processing unit (GPU) 1203 to render images and videos quickly and efficiently. It accelerates graphics processing, offloads tasks from the processing unit 1202, and enables real-time interactivity and high-quality visuals in applications. Depending on the configuration and type of computing device, system memory 1204 may comprise, but is not limited to, volatile (e.g., random access memory (RAM)), non-volatile (e.g., read-only memory (ROM)), flash memory, or any combination or memory. System memory 1204 may include operating system 1205, and one or more programming modules 1206. Operating system 1205, for example, may be suitable for controlling computing device 1200's operation. In one embodiment, programming modules 1206 may include, for example, a program module 1207 for executing the actions of devices 110, 114, and 118, for example. Furthermore, embodiments of the invention may be practiced in conjunction with a graphics library, other operating systems, or any other application program and is not limited to any particular application or system. This basic configuration is illustrated in FIG. 12 by those components within a dashed line 1220.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and nonvolatile, removable and non-removable media implemented in any method or technology for storage of information, such as computer readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a camera, a touch input device, etc. Output device(s) 1214 such as a display, speakers, a printer, etc. may also be included. The aforementioned devices are only examples, and other devices may be added or substituted.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1204, including operating system 1205. While executing on processing unit 1202, programming modules 1206 (e.g., program module 1207) may perform processes including, for example, one or more of the stages of the methods 400, 500, 600 as described above. The aforementioned processes are examples, and processing unit 1202 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable user electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. It is understood that, in certain embodiments, the functions/acts noted in the blocks may occur out of order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It should be also noted that additional information about the attached methods and systems is included in the appendix to this specification, the substance of which Application hereby incorporated by reference.

We claim:

1. A method for creating a physical three-dimensional model based on a plurality of digital assets while providing a user with a real-time, dynamically rendered composite three-dimensional model through an API gateway, without provisioning or managing third-party servers, for reducing data storage costs and improving rendering speeds, the method comprising:
    receiving, over a communications network from a first computing device, a compressed three-dimensional base model; wherein the compressed three-dimensional base model was generated according to a model generation method comprising (i) applying Boolean intersection operations on a low polygon three-dimensional base model to define a plurality of planes; and
    (ii) generating a plurality of textures, wherein each of the plurality of textures is configured to be received by each of a plurality of materials corresponding to at least one of the plurality of planes;
    storing, on a connected database, the compressed three-dimensional base model;
    receiving, over the communications network from a third computing device, a request to combine a plurality of digital assets having a plurality of characteristics related to the compressed three-dimensional base model;
    determining whether the third computing device comprises a predetermined threshold number of the plurality of digital assets;
    if the predetermined threshold number of the plurality of digital assets is met, then modifying the compressed three-dimensional base model based on the plurality of characteristics of the plurality of digital assets;
    generating a three-dimensional genesis model based on the modified, compressed three-dimensional base model; and
    printing a physical three-dimensional model based on the three-dimensional genesis model.

2. The method of claim 1 further comprising generating a two-dimensional graphical representation of the three-dimensional genesis model.

3. The method of claim 2 further comprising:
    sending over the communications network to a blockchain network, at least one of the two-dimensional graphical representation and the three-dimensional genesis model to be stored on the blockchain network; and minting a genesis token based on the at least one of the two-dimensional graphical representation and the three-dimensional genesis model stored on the blockchain network.

4. The method of claim 3, wherein the model generation method further comprises:
   a) generating a plurality of base objects;
   b) generating a high polygon three-dimensional base model comprising a body assembly of the plurality of base objects;
   c) decimating the high polygon three-dimensional base model into a low polygon three-dimensional base model;
   d) applying a plurality of materials to each of the plurality of base objects in the body assembly of the low polygon three-dimensional base model;
   e) applying a plurality of shaders to at least one of the plurality of materials; and
   f) compressing the low polygon three-dimensional base model into a compressed three-dimensional base model.

5. The method of claim 4, wherein the model generation method further comprises:
   sending, over the communications network to a blockchain network, the plurality of textures and the plurality of base objects to be stored on the blockchain network; and
   minting a plurality of tokens, wherein each token is associated with one of (i) a texture of a plurality of textures, and (ii) a base object of the plurality of base objects that is stored on the blockchain network.

6. The method of claim 5, wherein the model generation method further comprises:
   generating a two-dimensional surface representation of the low polygon three-dimensional base model;
   projecting the two-dimensional surface representation in a top-down model; and
   compressing the top-down model of the low polygon three-dimensional base model defining a compressed top-down model.

7. The method of claim 6, wherein before generating the three-dimensional genesis model based on the modified, compressed three-dimensional base model, the method further comprises:
   receiving, over the communications network from a first computing device, the compressed top-down base model;
   storing, on the connected database, the compressed top-down model;
   sending, over the communications network to the third computing device, a graphical user interface, to be displayed on the third computing device, the graphical user interface comprising a graphical representation of the plurality of textures and a three-dimensional rendering based on at least one of the compressed three-dimensional base model and the compressed top-down model; and
   continuously updating, in real time, the three-dimensional rendering based on user inputs on the third computing device.

8. The method of claim 7, wherein continuously updating continuously updating, in real time, the three-dimensional rendering based on user inputs on the third computing device further comprises:
   receiving selection data, over the communications network from the third computing device, input on the third computing device, wherein the selection data comprising a selected texture of at least one of the plurality of textures;
   applying the selected texture to at least one of (i) the compressed top-down model, and (ii) the compressed three-dimensional base model, which are stored on the connected database; and
   simultaneously while applying the selected texture, sending, over the communications network to the third computing device, update data comprising an updated three-dimensional rendering of the compressed three-dimensional base model, wherein the update data is configured for updating the graphical user interface to display the updated three-dimensional rendering on the third computing device.

9. A method for creating a physical three-dimensional model based on a plurality of digital assets while providing a user with a real-time, dynamically rendered composite three-dimensional model through an API gateway, without provisioning or managing third-party servers, for reducing data storage costs and improving rendering speeds, the method comprising:
   receiving, over a communications network from a first computing device, a compressed top-down model and a compressed three-dimensional base model; wherein the compressed top-down model and the compressed three-dimensional base model were generated according to a model generation method, the model generation method comprising:
   a) applying Boolean intersection operations on a low polygon three-dimensional base model to define a plurality of planes;
   b) applying a plurality of materials to each of the plurality of base objects in the body assembly of the low polygon three-dimensional base model;
   c) applying a plurality of shaders to at least one of the plurality of materials;
   d) generating a plurality of textures, wherein each of the plurality of textures is configured to be received by each of the plurality of materials corresponding to at least one of the plurality of planes;
   storing, on a connected database, the compressed top-down model and the compressed three-dimensional base model;
   receiving, over the communications network from a third computing device, a request to combine a plurality of tokens which are stored on the third computing device;
   determining whether the third computing device comprises a predetermined threshold number of the plurality of tokens; and
   if the predetermined threshold number of the plurality of tokens is met, then sending, over the communications network to the third computing device, a graphical user interface, to be displayed on the third computing device, the graphical user interface comprising a graphical representation of a plurality of textures and a three-dimensional rendering based on at least one of the compressed three-dimensional base model and the compressed top-down model.

10. The method of claim 9, wherein the model generation method further comprises:
   prior to applying Boolean intersection operations on the low polygon three-dimensional base model to define a plurality of planes:

generating a plurality of base objects;
generating a high polygon three-dimensional base model comprising a body assembly of the plurality of base objects;
decimating the high polygon three-dimensional base model into a low polygon three-dimensional base model;
after generating the plurality of textures, then sending, over the communications network to a blockchain network, the plurality of textures and the plurality of base objects to be stored on the blockchain network;
minting a plurality of tokens, wherein each token is associated with one of (i) a texture of a plurality of textures, and (ii) a base object of the plurality of base objects that is stored on the blockchain network;
generating a two-dimensional surface representation of the low polygon three-dimensional base model;
projecting the two-dimensional surface representation in a top-down model;
compressing the top-down model of the low polygon three-dimensional base model defining a compressed top-down model; and
compressing the low polygon three-dimensional base model into a compressed three-dimensional base model.

11. The method of claim 9 further comprising receiving selection data, over the communications network from the third computing device, input on the third computing device, wherein the selection data comprising a selected texture of at least one of a plurality of textures.

12. The method of claim 9 further comprising applying a selected texture of a plurality of textures to at least one of (i) the compressed top-down model, and (ii) the compressed three-dimensional base model, which are stored on the connected database.

13. The method of claim 9 further comprising sending, over the communications network to the third computing device, update data comprising an updated three-dimensional rendering of the compressed three-dimensional base model, wherein the update data is configured for updating the graphical user interface to display the updated three-dimensional rendering on the third computing device.

14. The method of claim 9 further comprising generating a two-dimensional graphical representation of an updated three-dimensional rendering which was generated based on modifications to the compressed three-dimensional base model.

15. The method of claim 9 further comprising generating a three-dimensional genesis model based on (i) an updated three-dimensional rendering, which was generated based on modifications to the compressed three-dimensional base model, and (ii) the compressed three-dimensional base model.

16. The method of claim 9 further comprising printing a physical three-dimensional model based on a three-dimensional genesis model, generated based on modifications to the compressed three-dimensional based model, and the plurality of tokens.

17. The method of claim 9 further comprising sending over the communications network to a blockchain network, at least one of a two-dimensional graphical representation and a three-dimensional genesis model, that were generated based on the compressed three-dimensional base model, to be stored on the blockchain network.

18. The method of claim 9 further comprising minting a genesis token based on at least one of a two-dimensional graphical representation and a three-dimensional genesis model stored on a blockchain network, that were each generated based on the compressed three-dimensional base model.

19. A method for creating a physical three-dimensional model based on a plurality of digital assets while providing a user with a real-time, dynamically rendered composite three-dimensional model through an API gateway, without provisioning or managing third-party servers, for reducing data storage costs and improving rendering speeds, the method comprising:
receiving, over a communications network from a first computing device, a compressed top-down model and a compressed three-dimensional base model;
wherein the compressed top-down model and the compressed three-dimensional base model were generating according to a model generation method, the model generation method comprising:
i. generating a plurality of base objects;
ii. generating a high polygon three-dimensional base model comprising a body assembly of the plurality of base objects;
iii. decimating the high polygon three-dimensional base model into a low polygon three-dimensional base model;
iv. applying Boolean intersection operations on the low polygon three-dimensional base model to define a plurality of planes;
v. applying a plurality of materials to each of the plurality of base objects in the body assembly of the low polygon three-dimensional base model;
vi. applying a plurality of shaders to at least one of the plurality of materials;
vii. generating a plurality of textures, wherein each of the plurality of textures is configured to be received by each of the plurality of materials corresponding to at least one of the plurality of planes;
viii. sending, over the communications network to a blockchain network, the plurality of textures and the plurality of base objects to be stored on the blockchain network;
ix. minting a plurality of tokens, wherein each token is associated with one of (i) a texture of a plurality of textures, and (ii) a base object of the plurality of base objects that is stored on the blockchain network;
x. generating a two-dimensional surface representation of the low polygon three-dimensional base model;
xi. projecting the two-dimensional surface representation in a top-down model;
xii. compressing the top-down model of the low polygon three-dimensional base model defining a compressed top-down model;
xiii. compressing the low polygon three-dimensional base model into a compressed three-dimensional base model;
storing, on a connected database, the compressed top-down model and the compressed three-dimensional base model;
receiving, over the communications network from a third computing device, a request to combine the plurality of tokens based on the plurality of tokens which are stored on the third computing device;
determining whether the third computing device comprises a predetermined threshold number of the plurality of tokens;

if the predetermined threshold number of the plurality of tokens is met, then sending, over the communications network to the third computing device, a graphical user interface, to be displayed on the third computing device, the graphical user interface comprising a graphical representation of the plurality of textures and a three-dimensional rendering based on at least one of the compressed three-dimensional base model and the compressed top-down model;

receiving selection data, over the communications network from the third computing device, input on the third computing device, wherein the selection data comprising a selected texture of at least one of the plurality of textures;

applying the selected texture to at least one of (i) the compressed top-down model, and (ii) the compressed three-dimensional base model, which are stored on the connected database;

simultaneously while applying the selected texture, sending, over the communications network to the third computing device, update data comprising an updated three-dimensional rendering of the compressed three-dimensional base model, wherein the update data is configured for updating the graphical user interface to display the updated three-dimensional rendering on the third computing device;

generating a two-dimensional graphical representation of the updated three-dimensional rendering;

generating a three-dimensional genesis model based on the updated three-dimensional rendering and the compressed three-dimensional base model;

printing a physical three-dimensional model based on the three-dimensional genesis model and the plurality of tokens;

sending over the communications network to the blockchain network, at least one of the two-dimensional graphical representation and the three-dimensional genesis model to be stored on the blockchain network; and minting a genesis token based on the at least one of the two-dimensional graphical representation and the three-dimensional genesis model stored on the blockchain network.

* * * * *